(12) United States Patent
Mengwasser et al.

(10) Patent No.: US 10,779,179 B2
(45) Date of Patent: Sep. 15, 2020

(54) SYSTEM AND METHOD FOR LARGE-SCALE RADIO FREQUENCY SIGNAL COLLECTION AND PROCESSING

(71) Applicant: Aurora Insight Inc., Washington, DC (US)

(72) Inventors: Brian Thomas Mengwasser, Washington, DC (US); Jennifer L. Alvarez, Westminster, CO (US); Augustus S. Moore, Denver, CO (US)

(73) Assignee: AURORA INSIGHT INC., Washington, DC (US)

( * ) Notice: Subject to any disclaimer, the term of this patent is extended or adjusted under 35 U.S.C. 154(b) by 0 days.

(21) Appl. No.: 16/822,239

(22) Filed: Mar. 18, 2020

(65) Prior Publication Data

US 2020/0229011 A1 Jul. 16, 2020

Related U.S. Application Data

(63) Continuation-in-part of application No. 16/808,327, filed on Mar. 3, 2020, which is a continuation of application No. 16/384,621, filed on Apr. 15, 2019, now Pat. No. 10,582,401, which is a continuation-in-part of application No. 15/991,540, filed on May 29, 2018, now Pat. No. 10,338,118, and (Continued)

(51) Int. Cl.
| | |
|---|---|
| *H04B 17/00* | (2015.01) |
| *H04W 24/08* | (2009.01) |
| *H04W 64/00* | (2009.01) |
| *H04B 17/309* | (2015.01) |
| *G06N 20/00* | (2019.01) |

(52) U.S. Cl.
CPC ............ *H04W 24/08* (2013.01); *G06N 20/00* (2019.01); *H04B 17/309* (2015.01); *H04W 64/003* (2013.01)

(58) Field of Classification Search
USPC .......................... 455/67, 67.13, 67.7, 67.11
See application file for complete search history.

(56) References Cited

U.S. PATENT DOCUMENTS

| | | | |
|---|---|---|---|
| 7,664,492 B1 * | 2/2010 | Lee ........................ | H04W 16/28 455/422.1 |
| 8,780,968 B1 * | 7/2014 | Garcia ................... | H04W 24/10 375/228 |
| 9,237,543 B2 * | 1/2016 | Karr ........................ | G01S 1/026 |

(Continued)

*Primary Examiner* — Ankur Jain
*Assistant Examiner* — Max Mathew
(74) *Attorney, Agent, or Firm* — Brian S. Boon; Brian R. Galvin; Galvin Patent Law LLC

(57) ABSTRACT

A large-scale radio frequency signal collection and processing system comprising a plurality of sensor systems mounted on a plurality of collection platforms that integrates a plurality of overlapping datasets with differing characteristics (e.g., different resolutions, different view angles, different heights, different time periods, unrelated types of data) to generate an enriched dataset or datasets using a variety of processing techniques (e.g., statistical analysis, signal processing, image processing) that allows for more comprehensive analysis of the radio frequency signal landscape than would be possible using any of the datasets individually, or in combination but without such integration.

14 Claims, 26 Drawing Sheets

Related U.S. Application Data a continuation-in-part of application No. 15/585,102, filed on May 2, 2017.

(60) Provisional application No. 62/656,781, filed on Apr. 12, 2018, provisional application No. 62/305,513, filed on Mar. 8, 2016.

(56) References Cited

U.S. PATENT DOCUMENTS

| | | | |
|---|---|---|---|
| 9,521,566 B2 | 12/2016 | Ponnuswamy | |
| 10,194,328 B2* | 1/2019 | Dayanandan | H04W 16/18 |
| 2003/0103589 A1* | 6/2003 | Nohara | H04K 3/22 |
| | | | 375/350 |
| 2004/0201521 A1* | 10/2004 | Alvarez | G01S 19/05 |
| | | | 342/357.62 |
| 2007/0105502 A1* | 5/2007 | Agarwal | G01S 19/21 |
| | | | 455/63.1 |
| 2008/0305709 A1* | 12/2008 | Chan | H03K 17/955 |
| | | | 446/297 |
| 2009/0225887 A1* | 9/2009 | Sutton | H04L 27/2626 |
| | | | 375/267 |
| 2011/0045781 A1* | 2/2011 | Shellhammer | H04B 17/26 |
| | | | 455/67.11 |
| 2011/0125703 A1* | 5/2011 | Chuang | G01R 21/133 |
| | | | 706/54 |
| 2011/0261982 A1* | 10/2011 | Isozaki | H04R 25/305 |
| | | | 381/315 |
| 2012/0087421 A1* | 4/2012 | Six | H03L 7/0814 |
| | | | 375/259 |
| 2012/0231748 A1* | 9/2012 | Liu | H04W 52/367 |
| | | | 455/73 |
| 2013/0072130 A1* | 3/2013 | Rauma | H04B 17/20 |
| | | | 455/67.11 |
| 2014/0140225 A1* | 5/2014 | Wala | H04B 7/0613 |
| | | | 370/252 |
| 2016/0015325 A1* | 1/2016 | Lin | A61B 5/7257 |
| | | | 600/300 |
| 2017/0199269 A1* | 7/2017 | Allen | G01S 19/48 |
| 2017/0250766 A1* | 8/2017 | Dzierwa | H04B 17/373 |
| 2018/0211179 A1* | 7/2018 | Dzierwa | H04B 17/30 |
| 2018/0351826 A1* | 12/2018 | Ahlport | H04B 17/23 |
| 2019/0072601 A1* | 3/2019 | Dzierwa | G08B 21/18 |
| 2019/0126775 A1* | 5/2019 | Han | B60L 58/13 |
| 2019/0150019 A1* | 5/2019 | Saito | H04B 17/309 |
| | | | 370/252 |
| 2019/0150099 A1* | 5/2019 | Abdelmonem | H04W 24/10 |
| | | | 455/418 |
| 2019/0150130 A1* | 5/2019 | Yang | H04L 5/0092 |
| | | | 370/311 |
| 2019/0150150 A1* | 5/2019 | Calin | H04L 43/0811 |
| | | | 370/329 |
| 2019/0150158 A1* | 5/2019 | Farmanbar | H04W 24/02 |
| | | | 370/329 |

* cited by examiner

Enriched dataset
scale / detail enhancement 1900

Satellite platforms 1901
- global / national scale
- very large area
- low detail
+
Aerial platforms 1902
- state / regional scale
- large area
- moderate detail
+
Mobile ground platforms 1903
- regional / city scale
- moderate area
- high detail
+
Fixed ground platforms 1904
- city / street scale
- small area
- very high detail

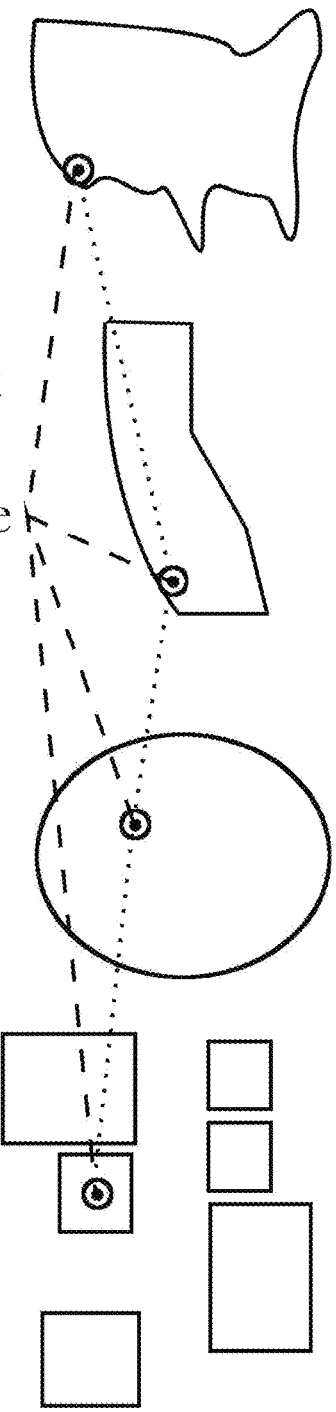

New signal at one level can trigger platforms at lower levels to investigate 1910

Fig. 19

SYSTEM AND METHOD FOR LARGE-SCALE RADIO FREQUENCY SIGNAL COLLECTION AND PROCESSING

CROSS-REFERENCE TO RELATED APPLICATIONS

| Application No. | Date Filed | Title |
| --- | --- | --- |
| Current application | Herewith | LARGE SCALE RADIO FREQUENCY SIGNAL INFORMATION PROCESSING AND ANALYSIS SYSTEM |
| | | Is a continuation-in-part of: |
| 16/808,327 | Mar. 3, 2020 | LARGE SCALE RADIO FREQUENCY SIGNAL INFORMATION PROCESSING AND ANALYSIS SYSTEM USING BIN-WISE PROCESSING |
| | | which is a continuation of: |
| 16/384,621 U.S. Pat. No. 10,582,401 | Apr. 15, 2019 Issue Date Mar. 3, 2020 | LARGE SCALE RADIO FREQUENCY SIGNAL INFORMATION PROCESSING AND ANALYSIS SYSTEM |
| | | which is a continuation-in-part of: |
| 15/991,540 U.S. Pat. No. 10,338,118 | May 29, 2018 Issue Date Jul. 2, 2019 | SYSTEM AND METHODS FOR DETECTING AND CHARACTERIZING ELECTROMAGNETIC EMISSIONS |
| | | which claims benefit of, and priority to: |
| 62/656,781 | Apr. 12, 2018 | SYSTEM AND METHODS FOR DETECTING AND CHARACTERIZING ELECTROMAGNETIC EMISSIONS |
| Current application | Herewith | LARGE SCALE RADIO FREQUENCY SIGNAL INFORMATION PROCESSING AND ANALYSIS SYSTEM |
| | | Is a continuation-in-part of: |
| 16/808,327 | Mar. 3, 2020 | LARGE SCALE RADIO FREQUENCY SIGNAL INFORMATION PROCESSING AND ANALYSIS SYSTEM USING BIN-WISE PROCESSING |
| | | which is a continuation of: |
| 16/384,621 U.S. Pat. No. 10,582,401 | Apr. 15, 2019 Issue Date Mar. 3, 2020 | LARGE SCALE RADIO FREQUENCY SIGNAL INFORMATION PROCESSING AND ANALYSIS SYSTEM |
| | | which is also a continuation-in-part of: |
| 15/585,102 | May 2, 2017 | SYSTEMS AND METHODS FOR MEASURING TERRESTRIAL SPECTRUM FROM SPACE |
| | | which claims benefit of, and priority to: |
| 62/305,513 | Mar. 8, 2016 | Systems and Methods for Measuring Terrestrial Spectrum from Space | the entire specification of each of which is incorporated herein by reference.

BACKGROUND

Field of the Art

The disclosure relates to the field of radio frequency signal collection and processing.

Discussion of the State of the Art

Most wireless telecommunication requires transmission and reception of radio frequency (radio frequency signal) signals in the radio frequency signal spectrum from frequencies of about 3 kHz to frequencies of about 300 GHz. Mobile, backhaul, consumer, fixed station, and public safety communications, to name a few, rely on frequencies in the radio frequency signal spectrum that are assigned, or allocated, for a particular use. Further, certain frequency bands are licensed to particular users in specified geographical areas.

Due to the proliferation of wireless communication applications, frequency bands for wireless communication in the radio frequency signal spectrum are becoming congested. Efforts continue to be made to increase the efficiency of frequency usage by consolidating and assigning unused or minimally used frequencies, and by reallocating frequencies for use as demand dictates. Additionally, transmitter output power is being reduced to limit the effective area of a transmitted signal so that frequencies can be reused based on geographical diversity. Consumer demand and trends towards high-data rate communications, which requires the use of increasing bandwidth and efficient transmissions methods, drive these innovations. As the complexity of wireless systems naturally increases to support more users in discrete bands, better systematic knowledge of the spectrum environment is needed to ensure proper operation. Indeed, proposed approaches such as dynamic spectrum allocation and cognitive radio techniques for spectrum sharing, to further enhance efficiency of spectrum use, require good knowledge of the spectral environment.

What is needed is a system and method for implementing large-scale radio frequency signal collection, processing, analysis, and mapping that allows for a comprehensive understanding of the radio frequency signal landscape over a wide geographical area, across a broad spectrum of radio frequency signals, and across a variety of time periods.

SUMMARY

Accordingly, the inventor has conceived and reduced to practice, a large-scale radio frequency signal collection and processing system comprising one or more sensor systems mounted on one or more collection platforms that integrates a plurality of overlapping datasets with differing characteristics (e.g., different resolutions, different view angles, different heights, different time periods, unrelated types of data) to generate an enriched dataset or datasets using a variety of processing techniques (e.g., statistical analysis, signal processing, image processing) that allow for more comprehensive analysis of the radio frequency signal landscape than would be possible using any of the datasets individually, or in combination but without such integration.

According to a preferred embodiment, a system for large-area, wide-bandwidth radio frequency signal collection and processing is disclosed, comprising: one or more collection platforms, each comprising: one or more radio frequency sensor systems configured to capture signal information comprising radio frequency data; and one or more metadata collectors configured to capture signal information comprising metadata about the radio frequency data, including at least a time, a frequency, and a location of capture; and an emission source analyzer comprising a processor, a memory, and a plurality of programming instructions stored in the memory which, when operating on the processor, cause the processor to: receive signal information from one or more of the collection platforms; pre-process the signal information to perform any combination of normalizing, reducing, analyzing, filtering, or organizing the data; and use the pre-processed data to: identify one or more radio frequency signals from an emission source; and generate radio frequency landscape information for the emission source, including at least: the frequencies of radio frequency signal emissions from the emission source; and the signal power of radio frequency signal emissions from the emission source.

According to an aspect of an embodiment, the system further comprises an enriched dataset generator comprising at least a plurality of programming instructions stored in a memory which, when operating on a processor, cause the processor to: receive a plurality of datasets comprising pre-processed signal information and further comprising at least one common or overlapping characteristic; separate each dataset into at least a spatial component, a time domain component, and a frequency domain component; map each element of each component of each dataset to their analogues in each of the other datasets in the plurality of datasets; develop statistics and metrics for one or more of the components; and combine the plurality of datasets, their components, and the mapping between them into a single dataset of higher information content than any one of the datasets comprising the plurality of datasets.

According to another preferred embodiment, a method for large-area, wide-bandwidth radio frequency signal collection and processing is disclosed, comprising the steps of: capturing signal information comprising radio frequency data and using radio frequency sensor systems on one or more collection platforms; capturing signal information comprising metadata about the radio frequency data, including at least a time, a frequency, and a location of capture, using metadata collectors on one or more collection platforms; and receiving signal information at an emission source analyzer from one or more collection platforms; pre-processing the signal information to perform any combination of normalizing, reducing, analyzing, filtering, or organizing the data; and using the pre-processed data to: identify one or more radio frequency signals from an emission source; and generate radio frequency landscape information for the emission source, including at least: the frequencies of radio frequency signal emissions from the emission source; and the signal power of radio frequency signal emissions from the emission source.

According to an aspect of an embodiment, the method further comprises the steps of: receiving into an enriched dataset a plurality of datasets comprising pre-processed signal information and further comprising at least one common or overlapping characteristic; separating each dataset into at least a spatial component, a time domain component, and a frequency domain component; mapping each element of each component of each dataset to their analogues in each of the other datasets in the plurality of datasets; developing statistics and metrics for one or more of the components; and combining the plurality of datasets, their components, and the mapping between them into a single dataset of higher information content than any one of the datasets comprising the plurality of datasets.

According to an aspect of an embodiment, the enriched dataset comprises sufficient information to produce a geographical map of radio frequency signals in a given area.

According to an aspect of an embodiment, the enriched dataset further comprises derivative information allowing production of a geographical map of radio frequency signals in a given area supplemented with analysis and statistics of radio frequency activity.

According to an aspect of an embodiment, the enriched dataset further comprises time information allowing production of a geographical map showing changes over time in the map of radio frequency signals in a given area.

According to an aspect of an embodiment, the enriched dataset further comprises population density information allowing production of a geographical map showing changes in population density over time relative to changes over time of radio frequency signals in a given area.

According to an aspect of an embodiment, the enriched dataset further comprises other non-radio-frequency-signal information allowing production of a map showing changes in the other non-radio-frequency-signal information over time relative to changes over time of radio frequency signals in a given area.

According to an aspect of an embodiment, a radio frequency signal detected by a sensor system or network of sensor systems triggers collection of more detailed data, less detailed data, wider area, narrower area, higher resolution, and/or lower resolution by at least one other sensor system on a related or unrelated collection platform or platforms.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 19 is a diagram illustrating scale and detail enhancement for an enriched dataset.

DETAILED DESCRIPTION

Figure 1:
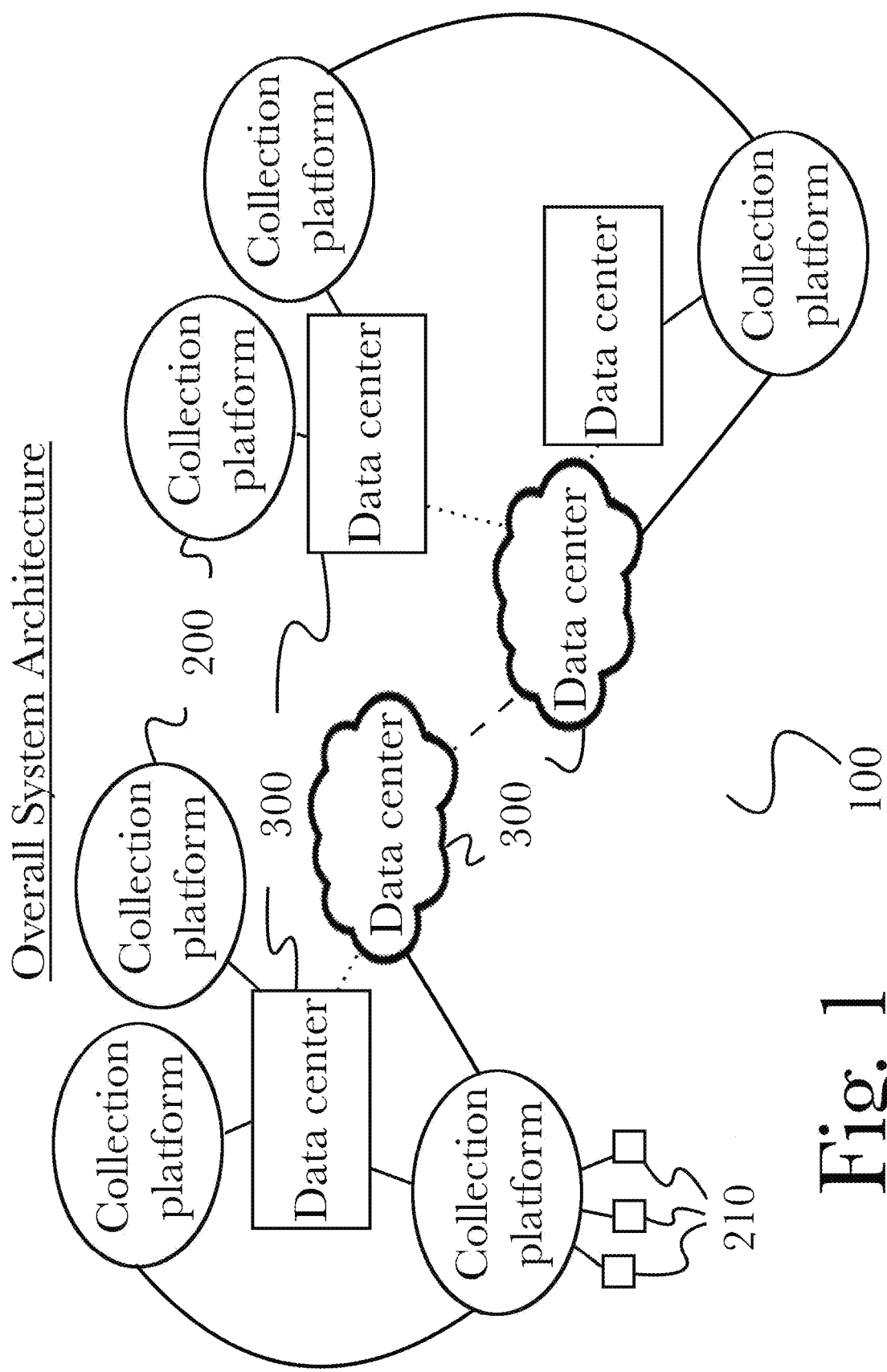
FIG. 1 is a diagram illustrating an exemplary overall system architecture for a large-scale radio frequency signal collection and processing system, according a preferred embodiment.

The inventor has conceived, and reduced to practice, a large-scale radio frequency signal collection and processing system comprising one or more sensor systems mounted on one or more collection platforms that integrates a plurality of overlapping datasets with differing characteristics (e.g., different resolutions, different view angles, different heights, different time periods, unrelated types of data) to generate an enriched dataset or datasets using a variety of processing techniques (e.g., statistical analysis, signal processing, image processing) that allows for more comprehensive analysis of the radio frequency signal landscape than would be possible using any of the datasets individually, or in combination but without such integration.

The enriched dataset would comprise a plurality of dimensions, allowing analysis of radio frequency signal beyond simple two-dimensional mapping. Using an analogy from satellite imagery, a single pass of a satellite from a high angle over a particular area might produce a relatively low-resolution two-dimensional image of that area. Certain features would be distinguishable, for example, roof tops, but other features might not be distinguishable because of the low-resolution, for example, air conditioning units on top of buildings. Further passes of the same satellite (or a different satellite with similar receiving characteristics) could be combined to produce a higher resolution two-dimensional image of that area, allowing previously undistinguishable features, such as the air conditioning units on top of buildings, to be distinguished. Satellites imaging the same area, but from a lower angle, would reveal characteristics that were not distinguishable from the higher angle, such as the sides of buildings, adding a third dimension to the data by extrapolation of building heights, etc. Further detail could be added by images from other datasets such as street level mobile phone images, or images on the internet with photos of certain buildings (for example, historical buildings). Additional dimensions could be added to the enriched dataset by integrating non-spatial data for the area. For example, a fourth dimension could be added showing the changes in data over time. A fifth dimension for analysis could be created by integrating population data for the same area, allowing population levels to be mapped onto the four-dimensional model from satellite imagery. Additional dimensions could be added integrating further datasets associated with that area.

In a manner similar to the analogy, enriched datasets can be created for radio frequency signals. High angle aerial or satellite receivers can create a map in a single pass of an area. Additional passes can be combined to produce refined levels of detail for that area. Reception from different angles can be used to identify directional radio frequency signals, creating a more representative map of the radio frequency signal coverage in the area. Lower altitude and ground-based reception can be used to provide a high level of detail and additional directional and localization information. These emissions can be tracked over time, creating a fourth dimension in the dataset. Additional dimensions can be added from processing and analysis of the radio frequency signals and/or derivative data (e.g., statistics on usage, coverage, technologies deployed, activity, etc.), and/or from disparate datasets, such as population data, telecom provider information, and other types of data.

In a manner that is the inverse of the satellite imagery analogy, enriched datasets can be created for radio frequency signals using local sensors that cue other sensors. For example, a local sensor might perceive a change in the radio frequency signal environment. This change might cause other sensors on a platform or a variety of different platforms to change sensor and/or platform behavior in response the sensed change in the radio frequency signal environment.

By integrating these various dimensions into an enriched dataset, greater insight can be gained from analyzing the data than from the use of individual datasets, or even from the use of combined datasets that are not so integrated. As one example, in order to determine potential signal interference for a certain application, it might be necessary to know the signal characteristics, location, and emission times of all emitters with similar signal characteristics in a particular area over a certain period of time. No single dataset or simple combination of datasets is likely to contain such information in a form useful for analysis, but an enriched dataset that integrates multiple datasets for such signals, containing such characteristics such as location of emission, direction of emission, and signal characteristics of emission would allow for the extrapolation of changes over time necessary for that application.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Augmentation data" as used herein is non-radio-frequency-signal data that may be combined with radio frequency signal data and metadata to further describe the radio frequency landscape and its context. Augmentation data may include, but is not limited to, demographic data (e.g. population density, housing density, income levels, etc.), real estate valuations, traffic data and patterns, building heights and locations, and terrain information.

"Data center" as used herein refers to any location used for storing and processing collected radio frequency signal data. The term data center does not exclude using a collection platform and/or sensors on a platform as the location for storing an processing the collected radio frequency signal data.

"Cloud-based" as used herein refers to any computing or data storage that takes place over a network of computing devices that are connected to, and accessible through, the internet.

"Collection platform" or "platform" as used herein refers to a surface, structure, vehicle, portable electronic device, or other object on which a sensor system may be mounted, in which a sensor system may be placed, or into which a sensor system may be integrated. Collection platforms may take a variety of forms, including, but not limited to fixed objects (e.g. desks, windows, towers, buildings, billboards, etc.), portable objects (backpacks, mobile phones, etc.), vehicles (cars, trucks, boats, etc.), small scale aircraft (e.g., drones, model airplanes, etc.), aircraft (airplanes, helicopters, etc.), balloons (hot-air balloons, weather balloons, etc.), and satellites.

"Emission source" as used herein means the source of a radio frequency signal emission.

"Landscape" or "radio frequency landscape" as used herein means the totality of radio frequency signal activity in a given area, including, but not limited to, signal times, signal locations, signal directions, signal altitudes, signal sources, signal frequencies, signal powers, areas of good reception, and areas of poor reception, and may include augmentation data.

"Metadata" as used herein means information describing the radio frequency data (for example, information about the sensor system and collection platform configuration, the area over which radio frequency data was collected, the time at which data was collected, look-angles of the sensor system or collection platform, operating characteristics of the sensor system or collection platform, including but not limited to, location, speed, orientation, movement relative to Earth, movement relative to other sensor systems, frequencies of operation, calibration data, times of operation, etc.), inputs from other algorithms, and/or inputs from other sources of information (for example, a database or list of cellular base station locations).

"Natural" or "naturally occurring" as used herein means a radio frequency signal that is of natural origin. For example, impulsive radio frequency signals generated by lightning.

"Radio frequency" as used herein means frequencies from about 3 kilohertz (3 kHz) to about 300 gigahertz (300 GHz).

"Radio frequency data" means any data associated with a radio frequency signal.

"Radio frequency signal" as used herein means any detectable electromagnetic radiation with a frequency or frequencies from about 3 kilohertz (3 kHz) to about 300 gigahertz (300 GHz).

"Sensor system" as used herein means a system capable of receiving radio frequency signals. Although some of the embodiments herein assume a complex sensor system such as a software-defined radio capable of detecting, receiving, processing, and storing radio frequency signals, the term sensor system is not so limited, and includes any system capable of receiving radio frequency signals from simple wire antenna receivers to sophisticated systems with directional antennas and complex circuitry.

"Signal" as used herein means radio frequency signal unless the context indicates otherwise.

"Signal information" means any information collected about a signal or used to describe a signal. This may include radio frequency data and metadata describing the radio frequency data (for example, information about the sensor system and collection platform configuration, the area over which radio frequency data was collected, the time at which data was collected, look-angles of the sensor system or collection platform, operating characteristics of the sensor system or collection platform, including but not limited to, location, speed, orientation, movement relative to Earth, movement relative to other sensor systems, frequencies of operation, calibration data, times of operation, etc.), inputs from other algorithms, and/or inputs from other sources of information (for example, a database or list of cellular base station locations). Signal information may be from one or more geographical locations or times.

"Enriched data" or "enriched dataset" as used herein means the combination, integration, correlation, convolution, de-convolution, and/or superimposition of a plurality of datasets with at least one common or overlapping characteristic in order to create a larger dataset allowing for more complex analysis than could be performed using the individual datasets that make up the enriched dataset. For example, the superimposition of several data sets from different perspectives may be used to create a new perspective on a scene or a unique interpretation of a scene. Integration of multiple lower resolution datasets (whether spatial, frequency, or time) may be used to obtain higher resolution data for the subject being studied.

"Synthetic" as used herein means a radio frequency signal that is of human origin. Note that not all synthetic signals are telecommunication signals. Many electronic devices (for example, microwave ovens) generate radio frequency signals that are not intended to convey information.

"Telecommunication signal" or "telecom signal" means any radio frequency signal carrying information intended to convey a message. Telecommunications signals may be analog or digital. Although telecommunication signals are frequently associated with mobile phones and mobile phone companies, the term as used herein is broader, and encompasses any form of synthetic radio frequency signal intending to convey information, including, but not limited to, radio, television, mobile phone, WiFi, Bluetooth, or other such transmission.

FIG. 1 is a diagram illustrating an exemplary overall system architecture for a large-scale radio frequency signal collection and processing system 100, according to a preferred embodiment. One or more collection platforms 200 with one or more sensor systems 210 may be used to receive, process, and/or transmit radio frequency data, associated metadata, and mappings to other collection platforms, sensor systems, and/or data centers 300, which may be local, remote, or cloud-based. Possible collection and processing may include collection of more detailed data, less detailed data, wider area, narrower area, higher resolution, and/or lower resolution by at least one other sensor system on a related or unrelated collection platform or platforms, if a radio frequency signal is detected by a sensor system or network of sensor systems. The data centers 300 may then perform a number of operations on collected information from multiple collection platforms 200 such as pre-processing of data, generation of enriched datasets, or modeling and deep analysis of data. In this manner it can be seen that radio frequency signal data collection flows from individual sensor systems 210 on each collection platform 200, from individual collection platforms 200 ultimately into data centers 300. Further, in some embodiments, collection platforms 200 may communicate directly with each other or through data centers 300 for processing to be accomplished at data centers 300 and/or at collection platforms 200 using data from multiple collection platforms 200. This effects a hierarchical collection process wherein many sensors feed data into a large-scale collection system that may be distributed across a wide area, with each component receiving and processing data before passing it to the next component for additional processing with other collected data.

Figure 2:
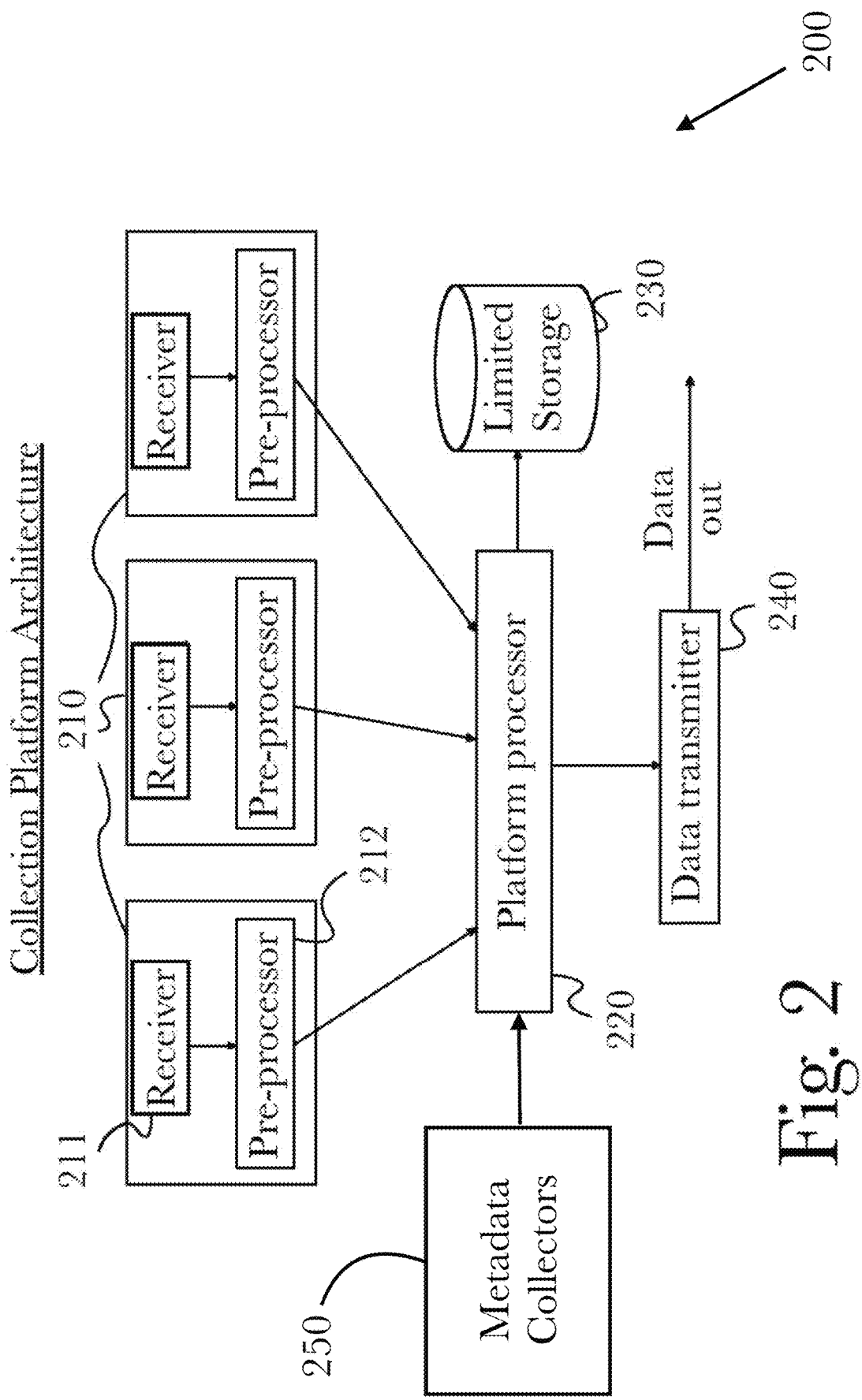
FIG. 2 is a block diagram of an exemplary collection platform architecture, according to an aspect.

FIG. 2 is a block diagram of an exemplary architecture of a collection platform 200, according to an aspect. The collection platform 200 may comprise one or more radio frequency sensor systems 210 that receive radio frequency signals from various natural or synthetic sources (for example, transmissions from cellular towers, mobile devices, satellites, natural events, and other sources of radio frequency signal). Each sensor system 210 may comprise a receiver 211 such as an antenna or system of antennas, for example a single antenna that may be tuned to a specific frequency band or may be a wide-band or configurable antenna that may be modified during operation to receive on different frequencies, or an array of antennas to provide coverage of multiple frequencies or areas (for example, multiple directional antennas oriented to receive from different geographical areas); radio frequency electronics that may condition the radio frequency signal to enhance or suppress certain characteristics, convert radio frequency signal to a different frequency, filter radio frequency signal, and/or perform other analog processing. For mobile collection platforms, and particularly airplanes which emit a strong, intermittent UAT and/or ADS-B locator signal, the receiver 211 may be configured to filter out the certain signals or interference from the platform, such as the ADS-B signal. Signals received by receivers 211 may be converted from analog emission waveforms to digital signals for processing, for example using signal analog-to-digital converters. Signal processing may occur at a variety of stages. For example, in some embodiments, the sensor system 210 may comprise a software-defined radio (SDR), which may have an on-board pre-processor 212 configured to perform any of a number of operations on the digitized signals before optionally sending signal output to a platform processor 220 that may perform additional pre-processing on data from multiple sensor systems 210 before transmitting the data to a data center 300. Collected signal information may be stored by platform processor 220 in a limited, on-board storage 230 such as for short-term storage of bulk signal data (for example, to enable a variety of analysis operations that may involve historical data) or short-term storage of processed data, or may be processed with data from other sensors, or may be transmitted via a data transmitter 240 as output to data centers or other sensors. It should be appreciated that any number of sensor systems 210, signal receivers 211, and pre-processors 212 may be utilized according to various arrangements and configurations, and the quantity and arrangement shown are merely exemplary. A variety of metadata collectors 250 may be on the collection platform. Metadata collectors 250 may be global positioning system (GPS) devices, vehicle speedometers, airspeed indicators, accelerometers, gyroscopic sensors, angle sensors, map databases, or any other device or system that provides contextual information about the radio frequency signal data being gathered. While shown here as separate devices from the sensor systems, metadata collectors 250 may be part of the sensor systems 210, themselves, and may provide information such as frequencies of operation, calibration data, times of operation, or other information that provides contextual information about the radio frequency signal data being gathered. Metadata from the metadata collectors 250 may be processed by an onboard platform processor 220 to combine it with the radio frequency data with which it is associated, or it may be passed through to storage 230 or a data transmitter 240.

Figure 3:
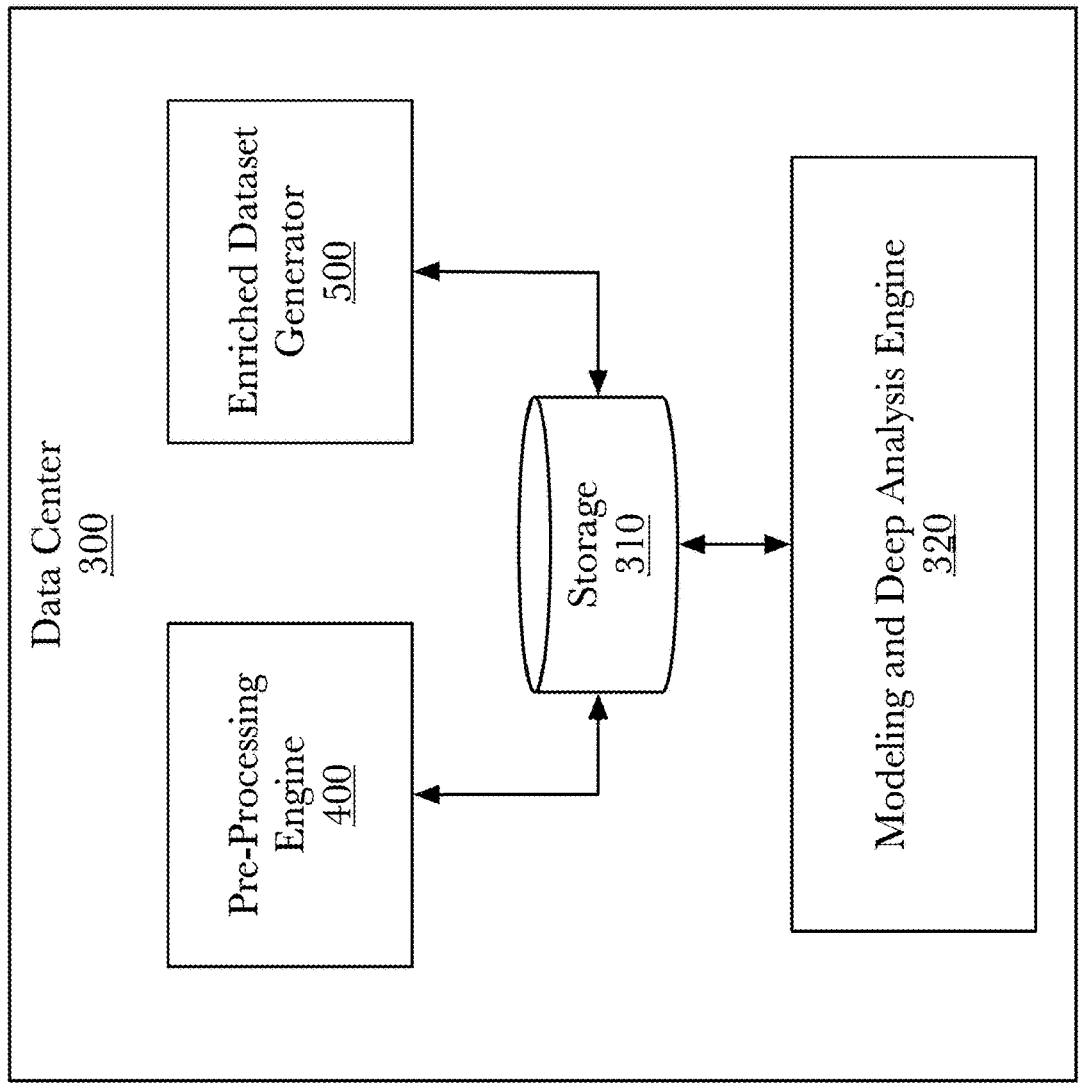
FIG. 3 is a diagram of an exemplary data center, according to one aspect.

FIG. 3 is a diagram of an exemplary data center 300, according to one aspect. Input from a number of collection platforms 200 or from a number of sensor systems 210 may be received at a data center 300 and processed through a pre-processing engine 400. Incoming data may be stored 310 for output to other processes. The pre-processing engine 400 may use a variety of algorithms to perform operations on collected data, for example including (but not limited to) filtering sensor data to remove unwanted data (for example, removing noise to clean up the dataset, or discriminating between unwanted signals and those of interest), running compression algorithms to reduce the size of data, and sorting portions of the sensor data based on factors such as frequency, intensity, duration, location, or other metrics. The modeling or deep analysis engine 320 may use a variety of algorithms to analyze the data to provide useful information to separate synthetic from naturally occurring signals, to determine the location, strength, and other characteristics of radio frequency signal data, the location, signal characteristics, and usage characteristics of telecommunications signals, telecom signals information such as frequency, bandwidth, modulation, efficiency, coverage, usage, location, and other characteristics.

Sensor data may be integrated from multiple sensors to produce complex datasets, for example to combine sensor data and produce a more complete dataset when data from only one or some of the sensors may be insufficient, or may be sufficient to answer some questions but have the potential to provide useful insights when combined with additional data. For example, combining signal strength in an area (cell coverage) with census information (population) to reveal "MHz-pop", a metric used in telecom applications. Mappings may be produced to correlate sensor data and produce derived insights, such as (for example, including but not limited to) spatial mapping to correlate signals with geospatial locations (such as identifying where signal sources are located, or areas of frequency band usage, or other such location-based information and analyses), time mapping to identify signal information over time (such as identifying when signals peak or overlap, or determining band utilization during certain time windows, for example), and frequency mapping to correlate sensor data over multiple frequencies and overcome potential shortcomings of using one or some sensors instead of the full dataset available from multiple collection platforms 200 (for example, to correlate information from multiple sensors detecting signals within a desired frequency band at different times, to form a more complete detection over a span of time instead of having detection gaps). The data may be processed through a number of algorithms at this stage to filter and sort the data for further analysis including (but not limited to) bin-wise processing that may be used to process signals over a number of frequency domain samples, for example using fast Fourier transform (FFT) frequency bins. Bin-wise processing operations may include (but are not limited to) mean, median, maximum, minimum, or other statistical value of a signal's amplitude, or the log of the amplitude, or of the power in each frequency domain sample. Frequency bins may be treated as the smallest non-time-series functional unit of radio frequency signal during processing, and bins may be grouped together as needed into blocks that may be processed as a single unit (for example, collapsing multiple adjacent bins into a single larger frequency block using any or a combination of minimum, maximum, mean, median, standard deviation, variance, skew, kurtosis, or other statistical measure). Additionally, calibration information for any number of sensors may be incorporated (if available), to improve analysis and detection of features such as low or negative signal-to-noise ratio energy, or absolute measurements of amplitude or power, which may be heavily-dependent on the calibration of the sensors providing data (for example, a poorly-calibrated sensor may misrepresent energy levels or simply miss low-energy signals that would have been detected if properly calibrated).

Data samples may incorporate some degree of preset or configurable overlap. Weak signal detection may be used to determine if the radio frequency signal data for any bin or time-series sample needs to be strengthened, for example to raise it above a noise floor or other threshold by using statistical techniques, to develop training data and apply machine learning techniques to datasets, for example to incorporate image analysis techniques based on sensor data mappings. Enriched dataset generation may be used to map data of different spatial, temporal, or frequency resolutions to produce an enriched dataset by combining multiple datasets or data from different sensor systems and/or collection platforms. Signal analysis may be used to analyze signals across a large number of frequency bands, for example to determine band utilization of a signal by analyzing the signal to estimate the fraction of time and frequency that the signal is above a noise floor for the respective frequency band. This may then be used to determine overall band utilization based on analysis of multiple signals within a frequency band and comparing against the band capacity or to apply enriched data to estimate geographical density of signal sources.

Figure 4:
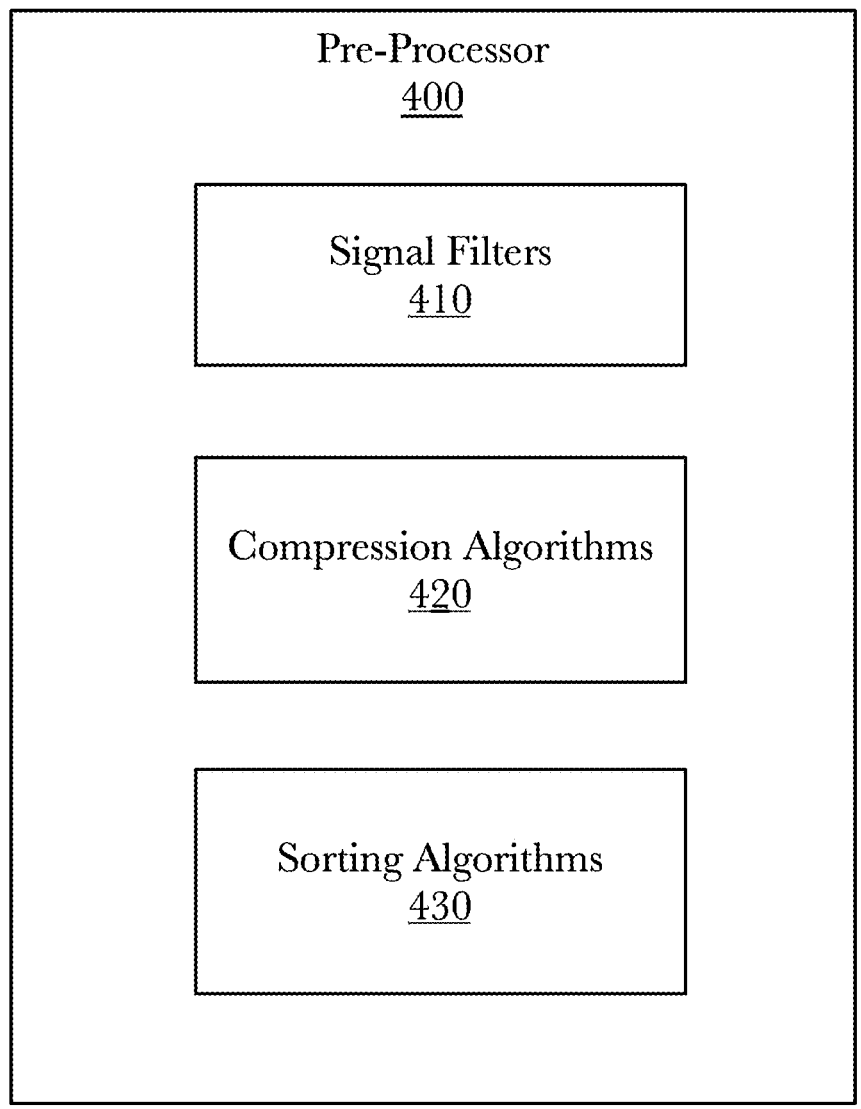
FIG. 4 is a block diagram illustrating an exemplary system architecture for a signal pre-processing system, according to one aspect.

FIG. 4 is a block diagram illustrating an exemplary system architecture for a signal pre-processing engine 400, according to one aspect. The pre-processing engine 400 may perform limited processing of the digital radio frequency signal data to reduce, analyze, filter, and/or organize the data. The pre-processing engine 400 may use a variety of algorithms to perform operations on collected data, for example including (but not limited to) using signal filters 410 to remove unwanted data (for example, removing noise to clean up the dataset, or discriminating between unwanted signals and those of interest), running compression algorithms 420 to reduce the size of data, and applying sorting algorithms 430 to sort portions of the sensor data based on factors such as frequency, intensity, duration, location, or other metrics.

Figure 5:
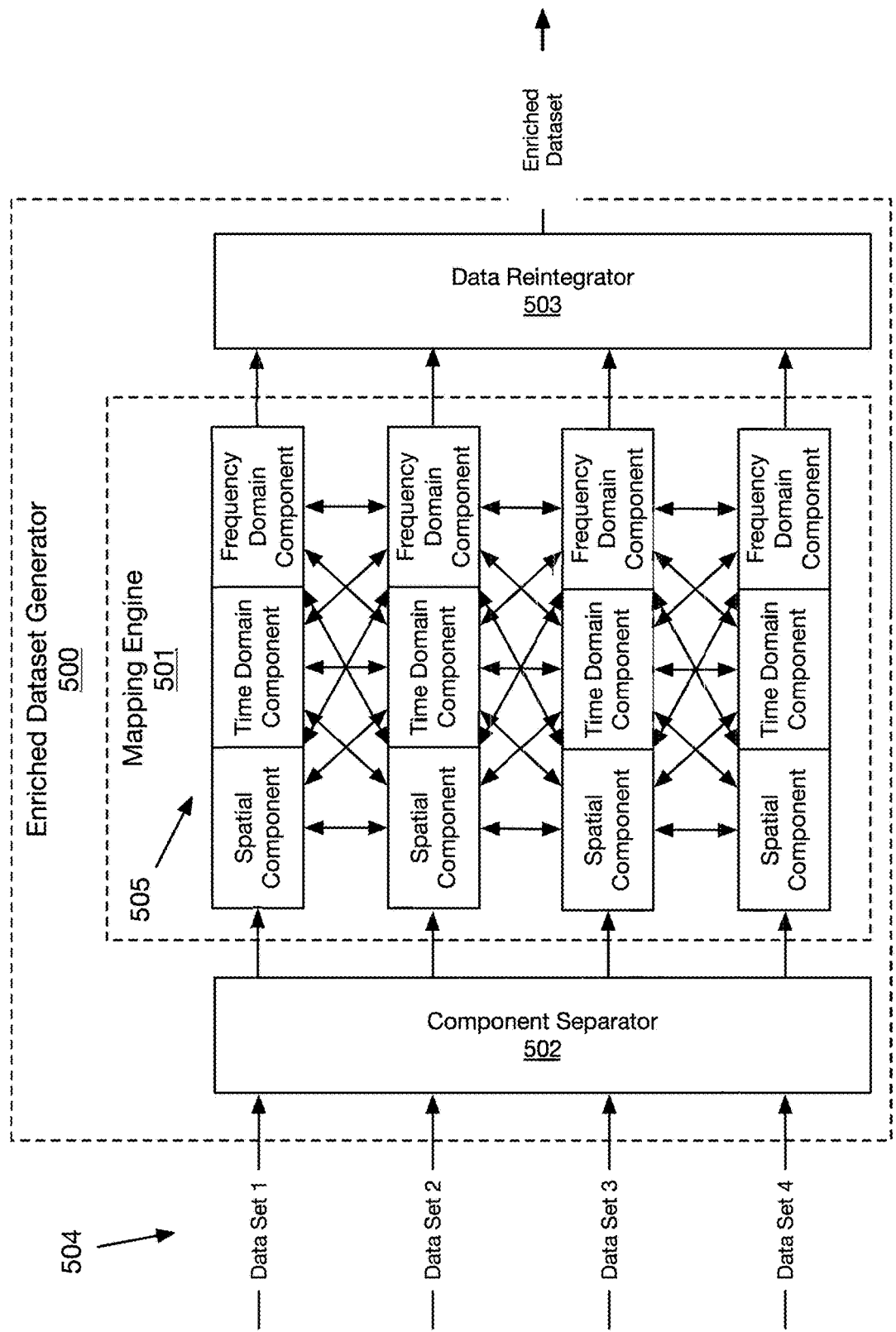
FIG. 5 is a diagram illustrating the operation of an enriched dataset generator, according to one aspect.

FIG. 5 is a diagram illustrating the operation of an enriched dataset generator 500, according to an aspect. Enriched dataset generator 500 may be used to combine sorted data into larger datasets that are used to reveal additional insights that would not be apparent from any single portion of data alone. A plurality of datasets 504 may be received from a pre-processing engine 400, for example each set may correspond to a particular sensor system, set of sensor systems, collection platform, or collection platforms, or other selection of radio frequency signal or non-radio frequency signal input data. A component separator 502 may then separate specific data components from each of the incoming datasets 504, separating out spatial, time domain, and frequency domain data components 505. These separate components may then be processed through a mapping engine 501, which maps between the individual components 505 from each of the multiple datasets 504, and then provides the mapping information to a data reintegrator 503, which combines the multiple datasets 504 using the mapping information to produce a single enriched dataset as output.

Figure 24:
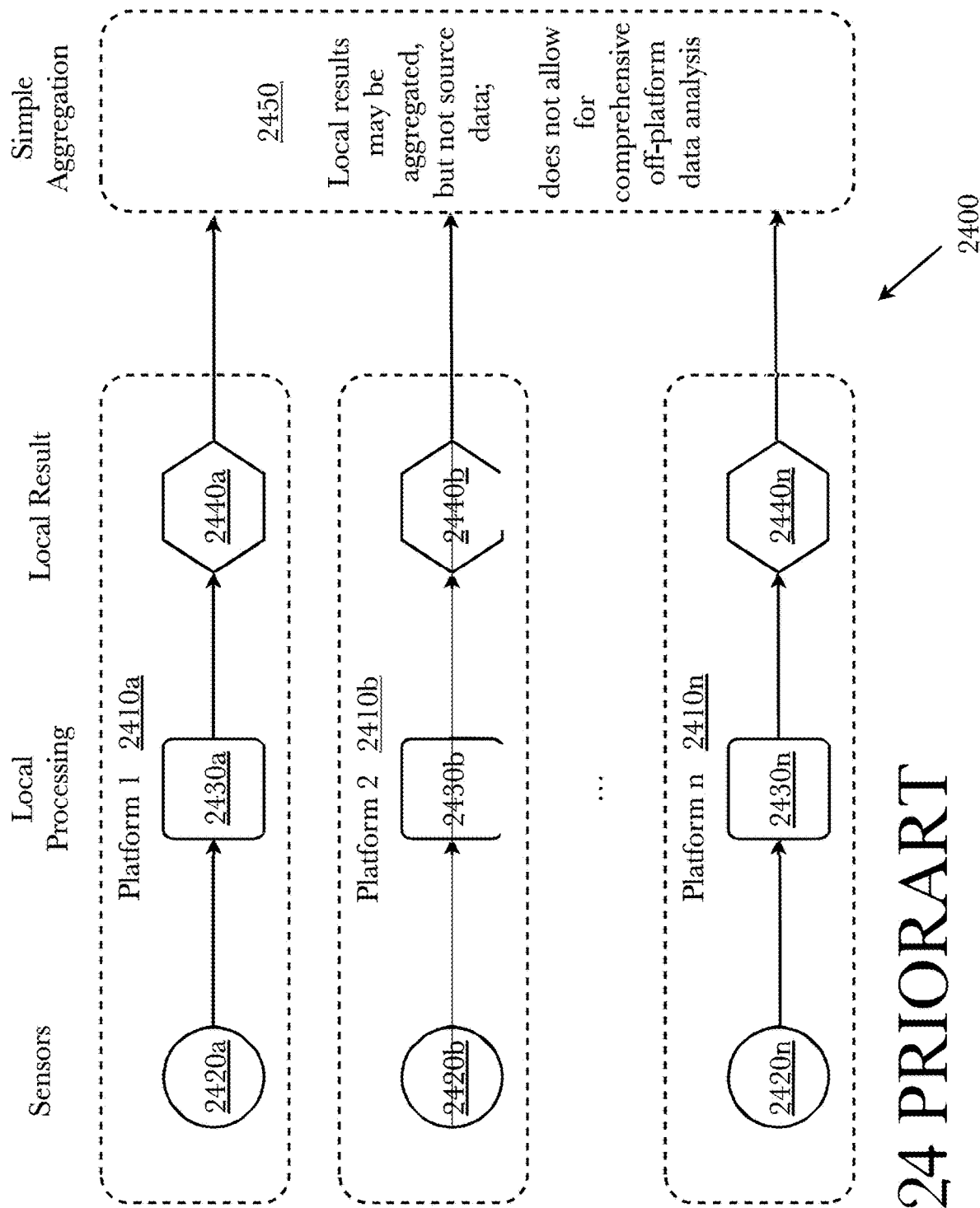
FIG. 24 is a diagram showing aspects of the current state of the art in radio frequency signal collection and processing.

FIG. 24 is a diagram showing aspects 2400 of the current state of the art in radio frequency signal collection and processing. In the current state of the art, data may be gathered from a plurality of collection platforms 2410a-n. The platforms comprise radio frequency sensors 2420a-n and local processors 2430a-n. The local processors 2430a-n may be located on-board the collection platforms 2410a-n, as shown in this diagram, or may be located off of the collection platforms 2410a-n. Data received by the sensors 2420a-n is processed locally using the local processors 2430a-n, and results 2440a-n are obtained prior to forwarding to remote locations for aggregation. The local processors 2430a-n may be located on-board the collection platforms 2410a-n, as shown in this diagram, or may be located off of the collection platforms 2410a-n, but in either case, the data received by the sensors on a particular platform is processed prior to forwarding to remote locations. The method of processing the raw/source data locally, obtaining results, and forwarding the results, is a simple aggregation process 2450 that prevents sophisticated analysis of the raw/source data received from the sensors. A tremendous amount of information contained in the raw/source data is lost during the process.

Figure 25:
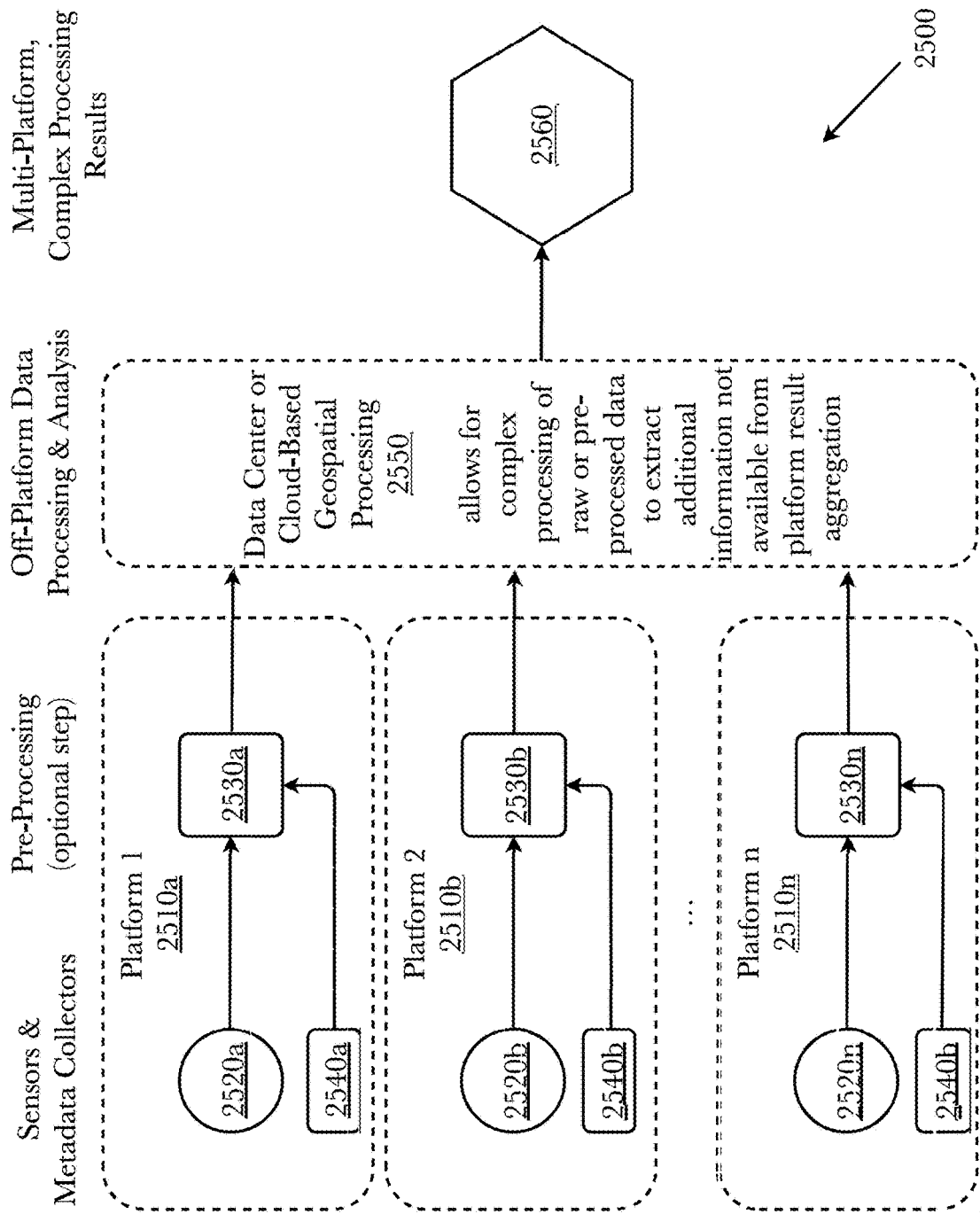
FIG. 25 is a diagram of aspects of an embodiment of a large-scale radio frequency signal collection and processing system showing improvements over the state of the art.

FIG. 25 is a diagram of aspects 2500 of an embodiment of a large-scale radio frequency signal collection and processing system showing improvements over the state of the art. In this embodiment, data are gathered from one or more collection platforms 2510a-n. The collection platforms comprise sensor systems 2520a-n, metadata collectors 2540a-n, and optionally pre-processors 2530a-n. Radio frequency signal data are obtained using the sensor systems 2520a-n, along with metadata from metadata collectors 2540a-n, which further describes the radio frequency signal data. The data and metadata may be pre-processed using pre-processors 2530a-n to normalize, reduce, analyze, filter, or organize the data for later processing, or may be passed directly a data center or cloud-based network for geospatial processing 2550. Importantly, the raw/source and/or pre-processed data are not degraded during this process, and raw/source and/or pre-processed data from a large number of collection platforms 2510a-n may be combined into enhanced datasets. The enhanced datasets allow for complex processing of multi-platform datasets, resulting in extraction of additional information 2560 that is not available from simple locally-processed result aggregation, and. Because the information content from the raw/source and/or pre-processed data is still available, a great deal of additional information can be extracted using a variety of data processing algorithms. Information extraction can be further enhanced by the use of machine learning algorithms which can identify patterns in the data before or after processing by other algorithms. The larger the collection of data, the more information and detail can be extracted by sophisticated processing methods.

Figure 26:
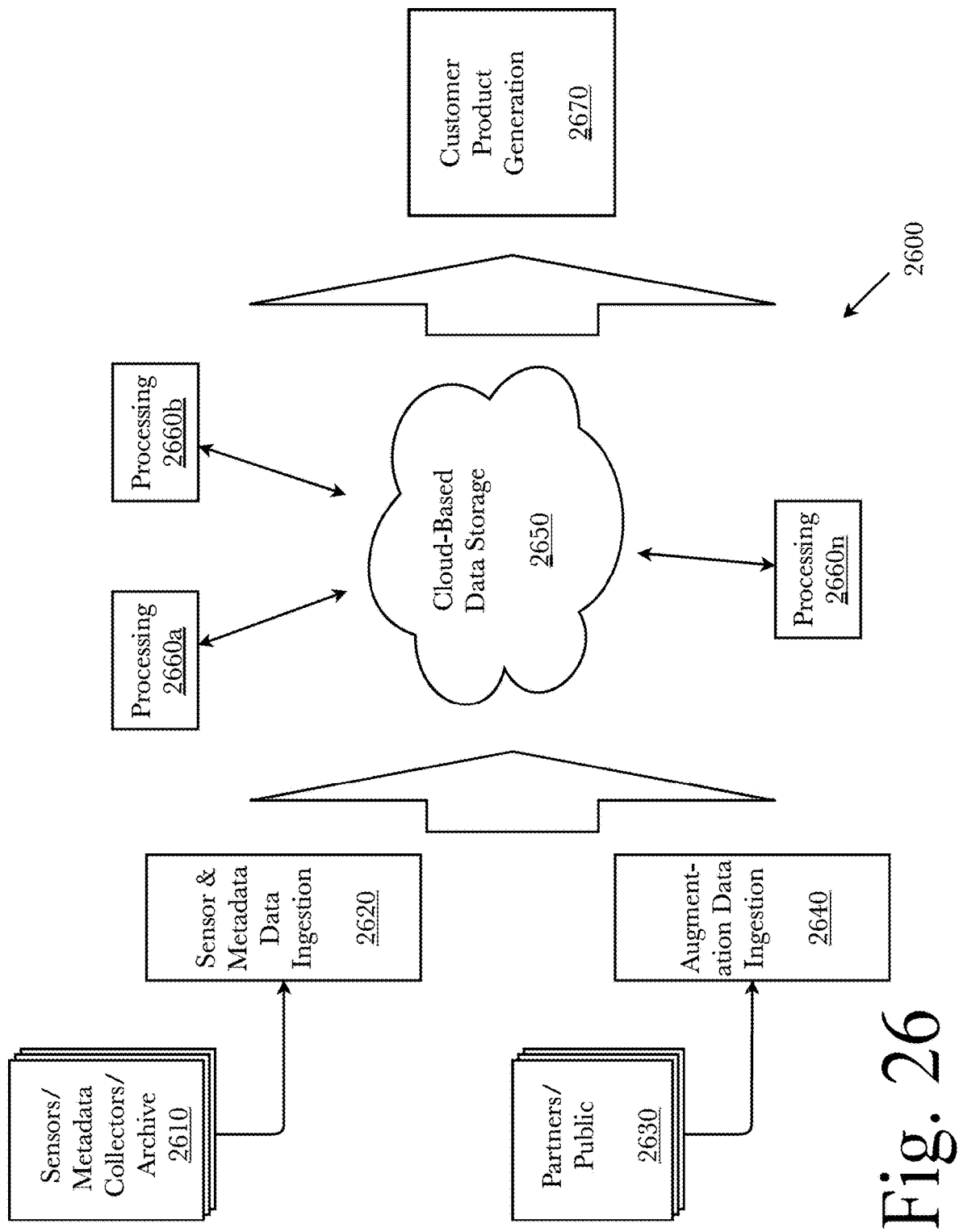
FIG. 26 is a diagram of additional aspects of an embodiment of a large-scale radio frequency signal collection and processing system showing the incorporation of augmentation data and cloud-based data storage and processing.

FIG. 26 is a diagram of additional aspects 2600 of an embodiment of a large-scale radio frequency signal collection and processing system showing the incorporation of augmentation data and cloud-based data storage and processing. As previously described, radio frequency signal data and metadata may be obtained from various data sources 2610, including but not limited to sensor systems, metadata collectors, or archives. The data thus obtained are input into the system 2620 and stored in data storage that allows for data aggregation, such as cloud-based storage 2650. Augmentation data may be obtained from augmentation data sources 2630 such as business partners, public records, crowdsourcing, etc. Augmentation data are also input into the system 2640 and stored in the cloud-based data storage 2650. A plurality of processing systems 2660a-n may have access to the cloud-based data storage 2650 and process the data to extract different kinds of information about the radio frequency landscape. These results can be used to generate data products 2670 useful to customers in various industries.

These additional aspects 2600 of the system may be used to extract or produce information about the radio frequency landscape that could otherwise be obtained. One example is the use of the system to track valuations of radio frequency equipment over time. For example, consider a piece of real estate located in a rural area, on which a single cell phone tower is located. The value of the property (or value of leasing the property) is augmented data (i.e., not radio frequency signal information), which can be associated with radio frequency signal data. Additionally, changes in the value of the property can be associated with changes in the radio frequency equipment and radio frequency usage on that property over time. If the area in which the property is located becomes urbanized, not only will the value of the property change, but it is likely that additional cell phone towers or other radio frequency equipment will be installed, and the usage profile of the radio frequencies will change. Changes in a wide variety of information relative to the property may be tracked, including such things as the number of operators using a tower, the specific operators using the towers, the value of the rent for having a cell tower on a building, value of the land leased by a tower company, and a wide variety of ratios and relationships can be created between the radio frequency signal information and the augmented data information. Broader changes can be tracked, as well, such as changes in the density of towers in a given area, which can reveal growth in population density. Relative changes in radio frequency usage can be tracked, such as installation of 4G sites where 3G used to be, or installation of 4G sites where 4G sites dominated.

DETAILED DESCRIPTION OF EXEMPLARY ASPECTS

Figure 6:
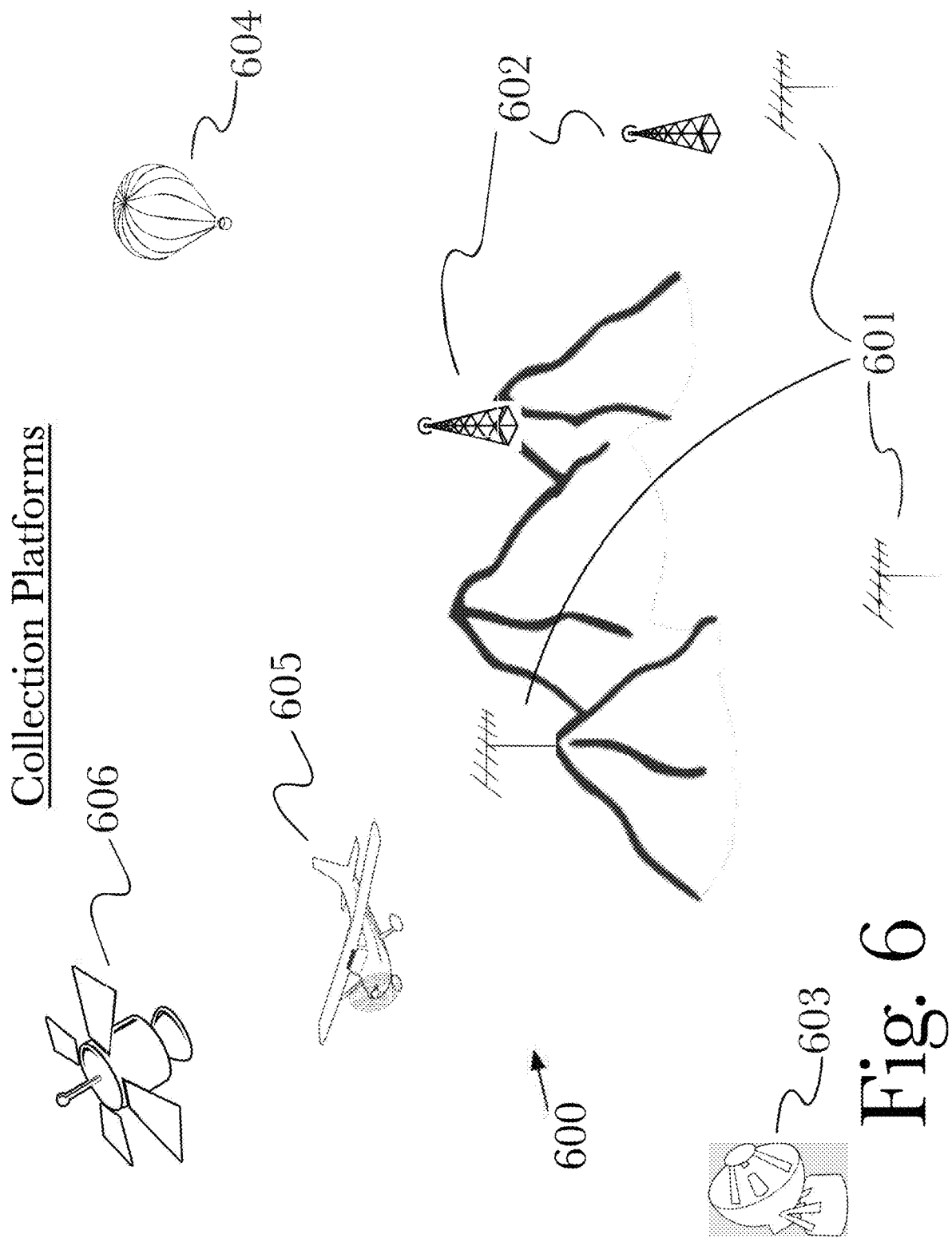
FIG. 6 is a diagram illustrating a variety of radio frequency receivers feeding into a radio frequency signal data analysis platform, according to one aspect.

FIG. 6 is a diagram illustrating a variety of radio frequency signal collection platforms 200 which may feed data into the overall system, according to one aspect. According to the aspect, the system as conceived herein would be most effective if a broad range of radio frequency signal data is collected from a variety of platforms with different characteristics as shown at 600. Ideally, the system would consist of a plurality of mobile platforms and stationary platforms. A plurality of different types of sensors would ideally be mounted on a plurality of different platforms such as satellites 606, airplanes 605, cars, or balloons 604, each of collects data using different instrumentation, from different altitudes, and in overlapping or distinct geographical areas. Stationary receivers would also be of a variety of types such as non-directional 602, directional 601, 603 and would be located in overlapping areas of coverage, or in geographically diverse locations, at different altitudes, and/or with different lines of sight. Groups of collection platforms may be used, for example in vehicle fleets such as cab or ridesharing services, aircraft operated by an airline, weather balloons, boats, or other fleet types or arrangements.

Figure 7:
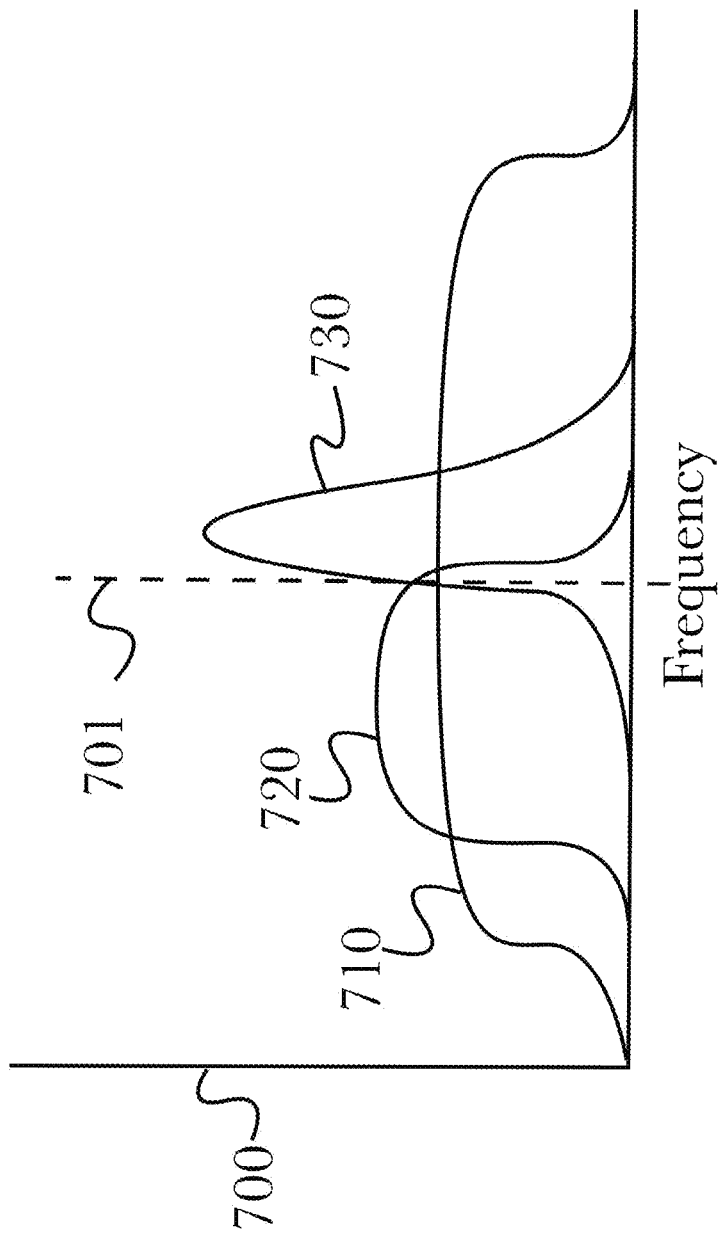
FIG. 7 is a diagram illustrating multiple bandwidth capability of a large-scale radio frequency signal system, according to one aspect.

FIG. 7 is a diagram illustrating multiple bandwidth capability of a large-scale radio frequency signal system, according to one aspect. As shown, a mapping 700 across multiple frequency bands may be used to identify or confirm a signal of interest 701 using sensors with different sensitivities and capabilities. Any one sensor may pick up a signal of interest 701, but the signal could be weak or indistinct. By combining sensors with different characteristics, for example, a wide-band sensor 710, medium-band sensor 720, and narrow-band sensor 730, a signal of interest 701 that might otherwise have been missed or indistinct can be confirmed or clarified.

Figure 8:
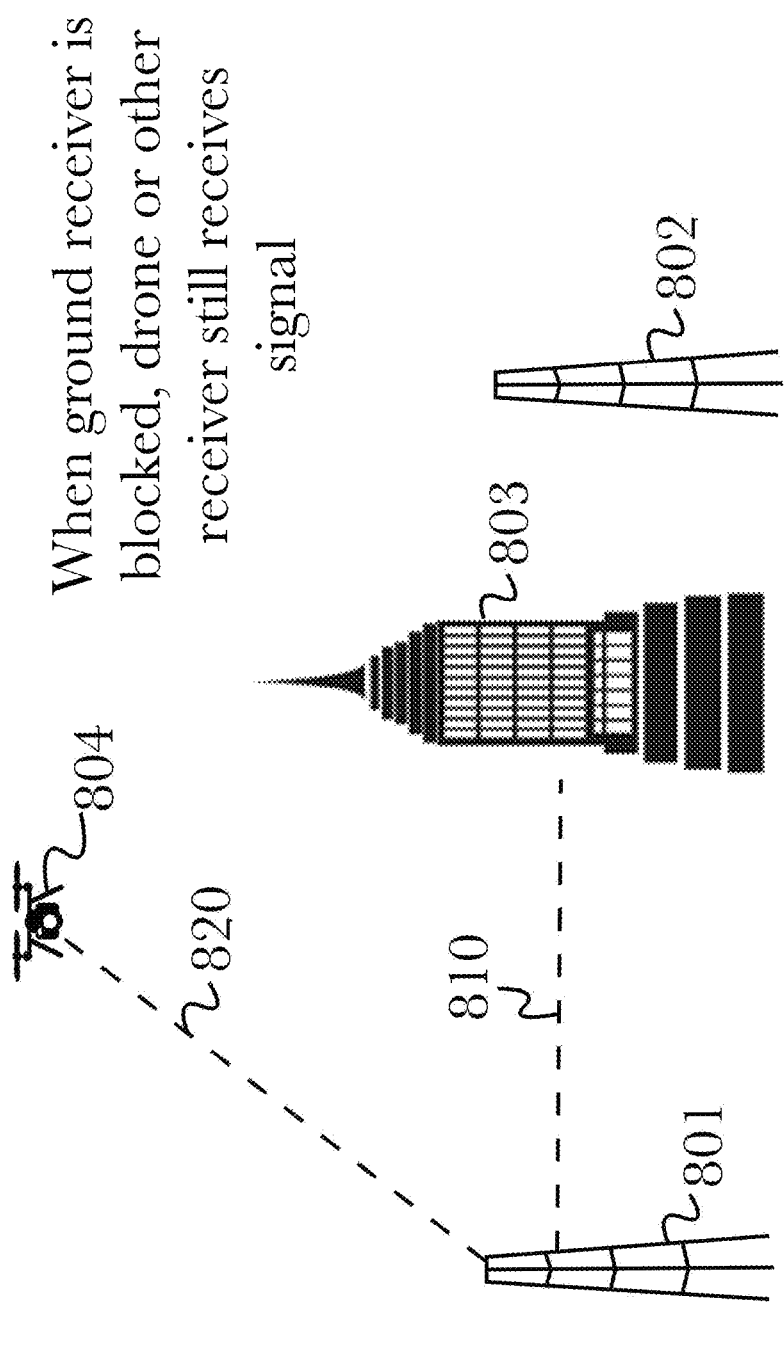
FIG. 8 is a diagram illustrating multiple radio frequency signal paths, according to one aspect.

FIG. 8 is a diagram illustrating multiple radio frequency signal paths, according to one aspect. As shown, a radio frequency signal in one direction 810 may be blocked or otherwise interfered with, for example by a building 803 that blocks the line-of-sight between an emission source 801 and receiving platform 802. In such cases, an alternate receiving platform may be available, such as a drone 804. By utilizing the large-scale architecture of the system 100, drone 804 may receive the blocked emission from a different direction 820 and thus feed it into the system 100 for use. In this manner it may be appreciated that the use of large-scale implementation with multiple sensors 210 installed on a variety of platforms (as shown in FIG. 6) enables more complete collection and analysis of emissions through the collection and correlation of multiple sensor data sources to overcome any shortcomings of, or interference with, any particular sensor.

Figure 9:
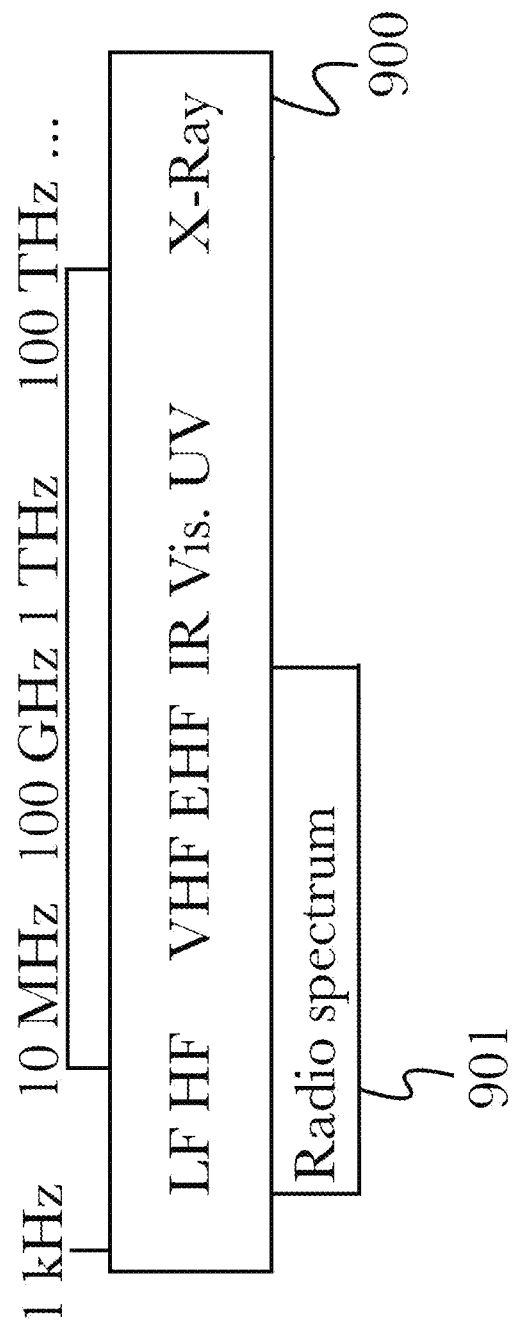
FIG. 9 is a diagram illustrating portions of the radio frequency signal spectrum, according to one aspect.

FIG. 9 is a diagram illustrating portions of the electromagnetic spectrum 900 that may be collected by the system 100, according to one aspect. The electromagnetic spectrum 900 comprises a wide variety of frequency bands that characterize radio frequency signals, with frequencies from about 3 kHz to 300 GHz being grouped into the radio spectrum 901 and frequencies above 300 GHz corresponding to infrared, visible light, ultraviolet, x-rays, and gamma rays. According to various aspects and arrangements, a large-scale radio frequency signal collection platform may be used to collect and analyze sensor data across any number of frequency bands in the radio frequency spectrum 901. For example, sensor data may be collected across a variety of radio frequency bands, and used to form more complex mappings that may yield additional analysis insights by incorporating information traditionally overlooked (or simply not available) as efforts are focused on certain portions of the radio frequency signal spectrum. As described previously (with reference to FIG. 4), individual frequency bins may be condensed into larger frequency blocks to enable handling as a single unit, allowing mapping and analysis operations to have adjustable granularity within the overall radio frequency signal spectrum and enabling efficient processing of both very fine, and very large, datasets.

Figure 10:
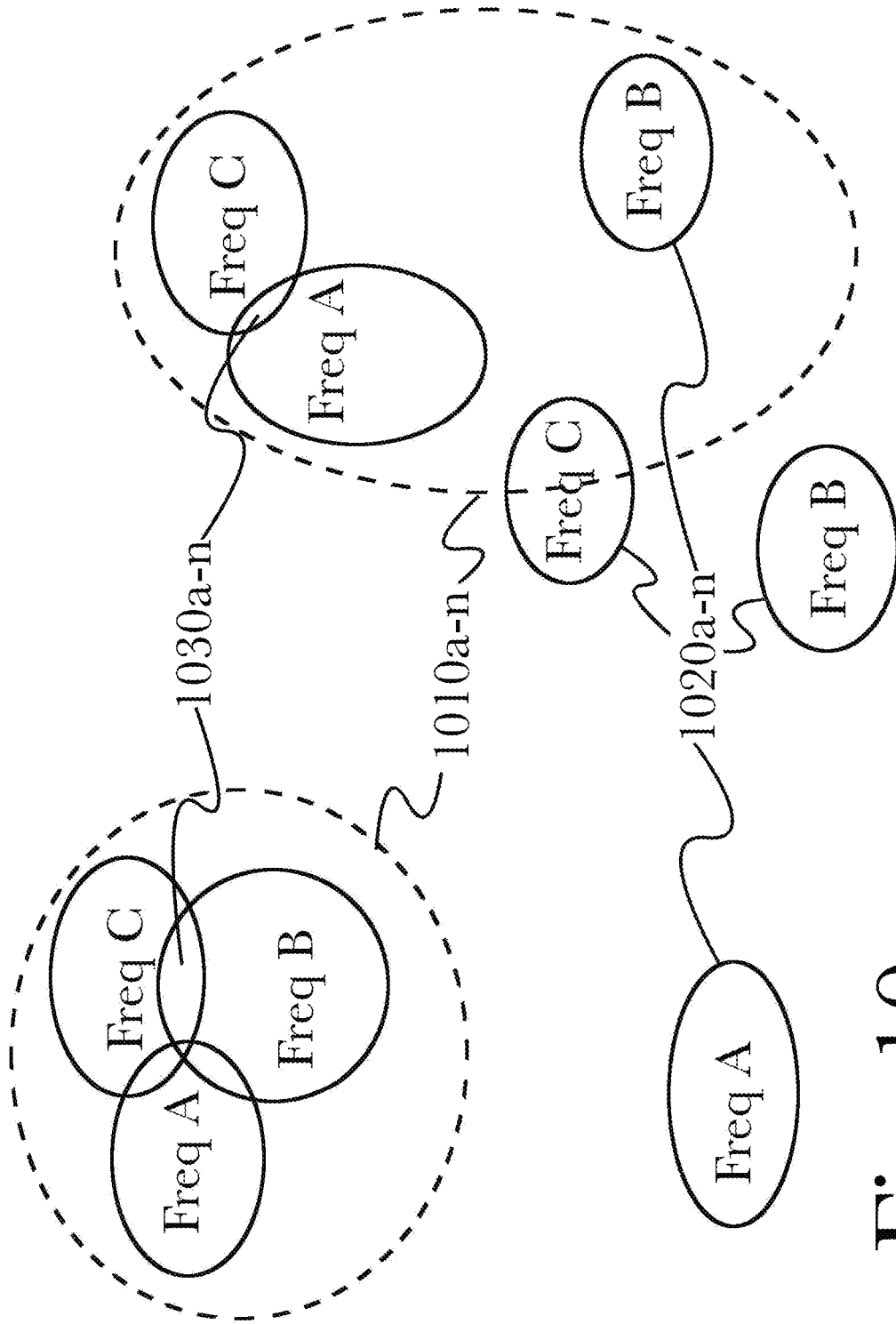
FIG. 10 is a diagram illustrating spatial and geographical mapping, according to one aspect.

FIG. 10 is a diagram illustrating spatial and geographical mapping, according to one aspect. As shown, mapping received signal and location information from sensors enables the correlation of emissions with geospatial regions where they occur (or from which they were emitted). Specific emissions may exist at certain frequencies 1020a-n (shown here as "Freq A", "Freq B", and "Freq C") and in certain geographic areas 1010a-n. Sometimes, emissions may overlap in some areas 1030a-n, indicating regions with multiple emission frequencies. It can be appreciated from the illustration that such spatial mapping enables rapid identification of both areas with one or more frequency bands, as well as frequency bands that occur in multiple regions. This mapping may be produced (for example) by a single collection platform 100 by correlating information from multiple sensors (for example, directional antennas that may receive on similar frequency bands in different regions, or that may receive on different frequency bands in the same location), or by a data center 300 by correlating information received from multiple, spatially-distinct collection platforms (for example, correlating information received from collection platforms in different regions but at the same frequencies).

Figure 11:
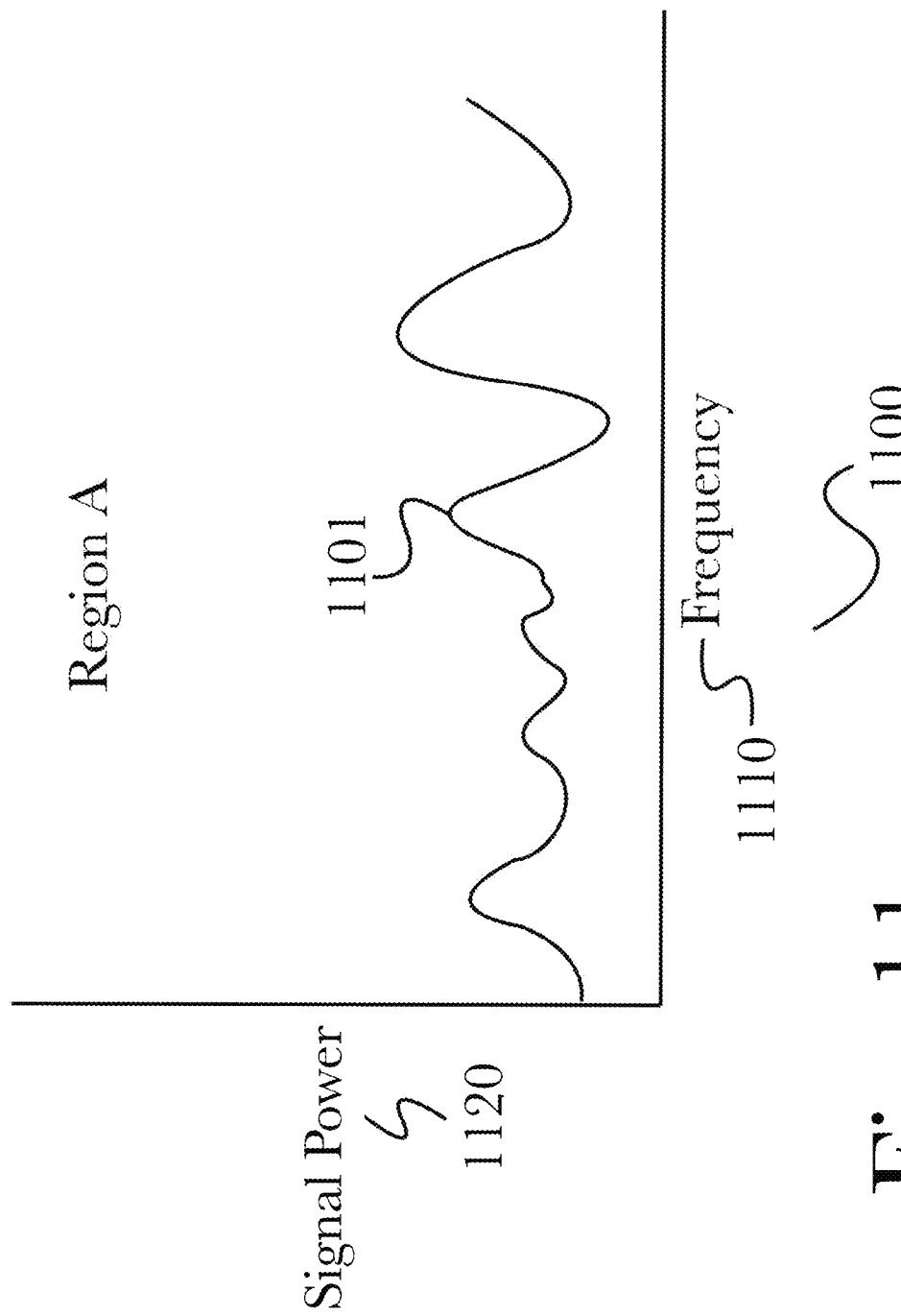
FIG. 11 is a diagram illustrating frequency mapping, according to one aspect.

FIG. 11 is a diagram illustrating frequency mapping 1100, according to one aspect. As shown, a frequency mapping 1100 may be used to correlate sensor data for frequencies 1110 versus signal power 1120 for a given region, indicating the respective intensity 1101 of a given frequency and enabling power-based analysis or analysis of specific frequency bands within the selected region.

Figure 12:
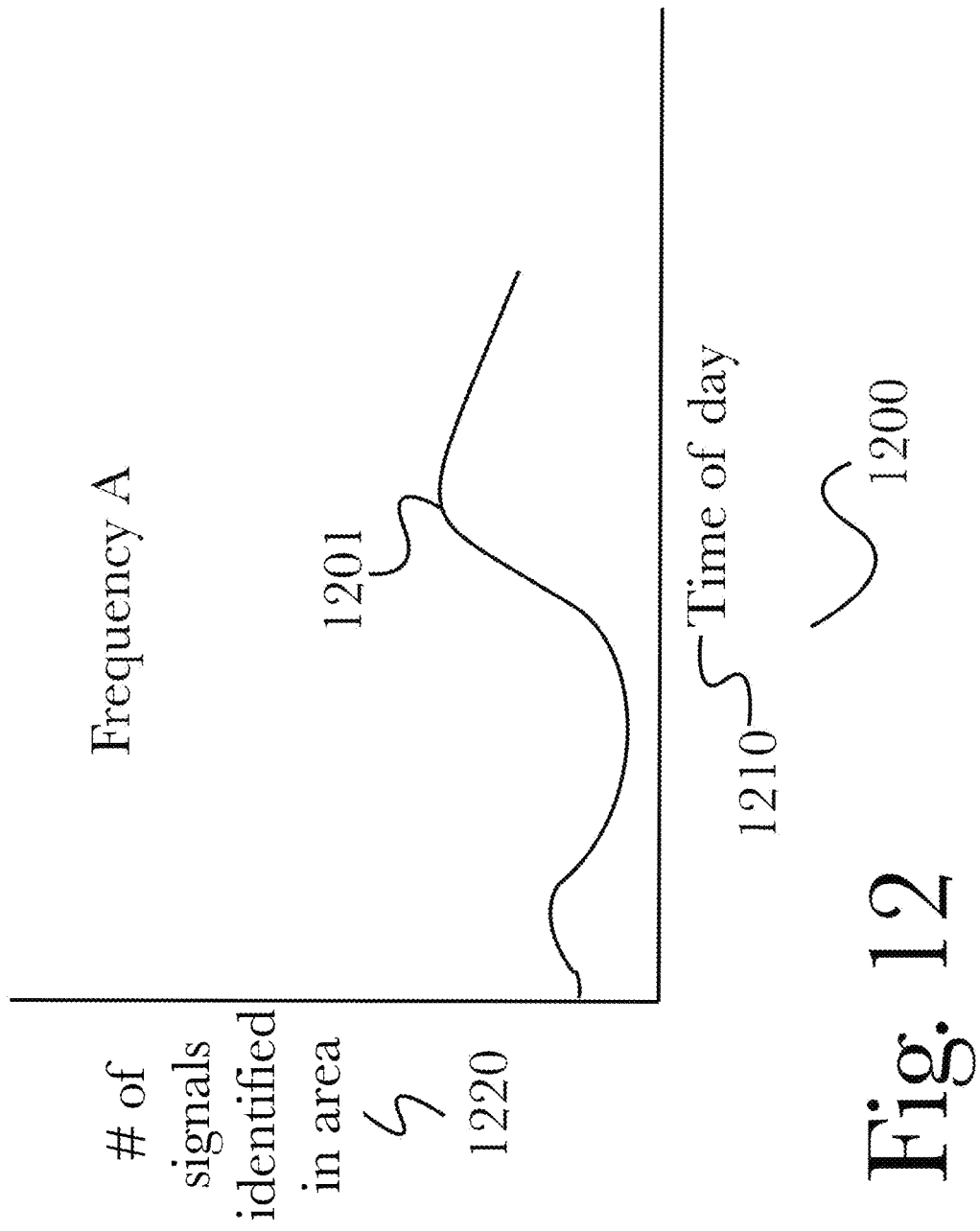
FIG. 12 is a diagram illustrating temporal mapping, according to one aspect.

FIG. 12 is a diagram illustrating temporal mapping 1200, according to one aspect. As shown, a temporal mapping 1200 may be used to correlate sensor data for the number of signals of that frequency in a given area 1220 over time 1210, to identify a current level 1201 of usage of a given frequency in a particular location over a span of time. This may be used to identify how a frequency band is being utilized, such as period of high-usage that may indicate the presence of additional transmissions or interference that may be saturating the band and interfering with desired signal emissions.

Figure 13:
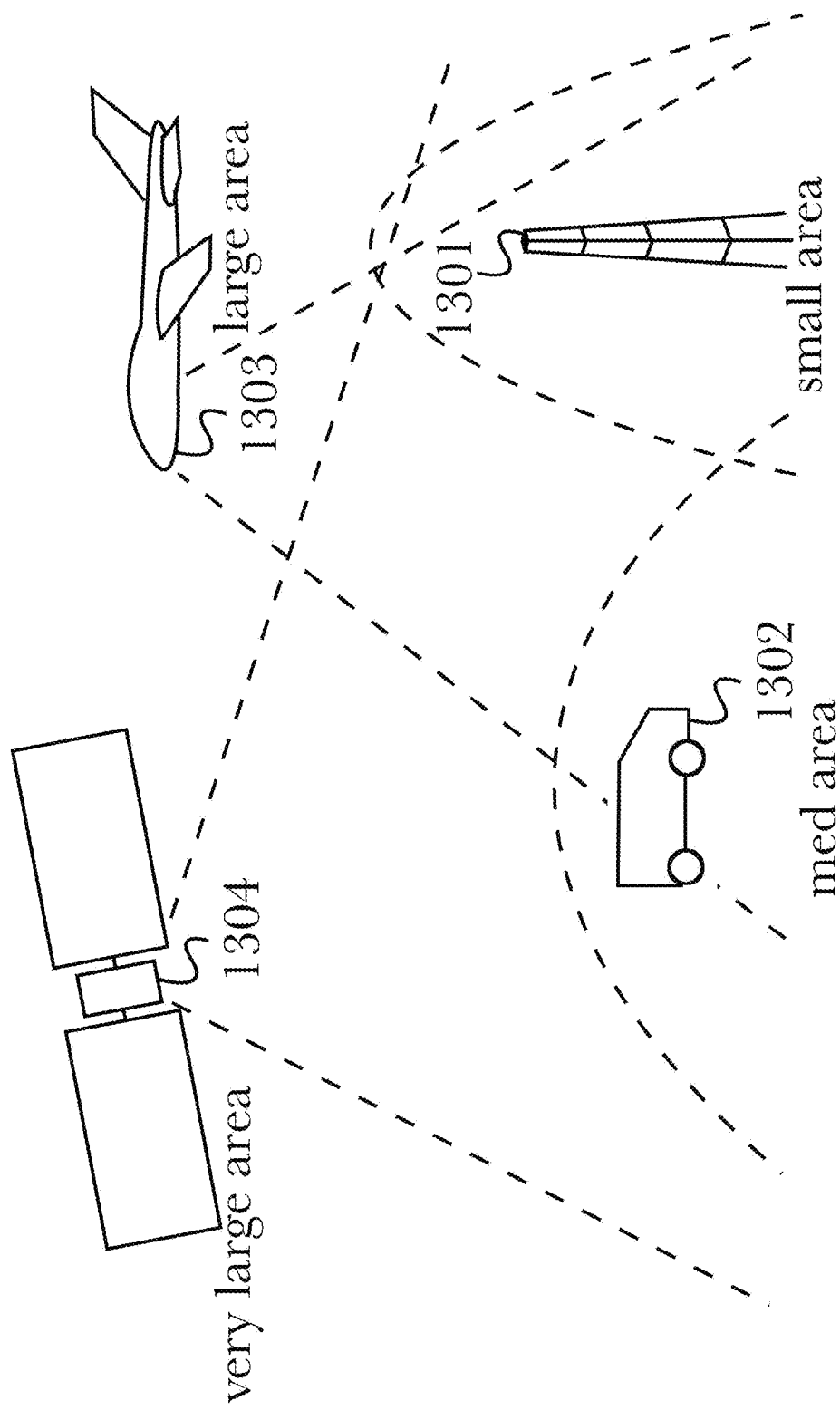
FIG. 13 is a diagram illustrating multiple levels of coverage, according to one aspect.

FIG. 13 is a diagram illustrating multiple levels of coverage, according to one aspect. As shown, various collection platforms (as discussed above, with reference to FIG. 6) may be used to incorporate the respective strengths of various platforms. For example, a stationary platform on a tower 1301 may have very high data transfer rate but a small detection area due to the stationary nature of the installation. Mobile platforms such as those installed on vehicles 1302 may have increased physical coverage as the platform can move around, but decreased data rate, for example, due to having to store data on a hard drive on the vehicle and remove the hard drive to manually transfer the data at certain intervals, or by having to transmit the data through a cellular connection. An airborne platform installed on an aircraft 1303 may have a much larger area still, with the same data rate issues as ground-based vehicles. A satellite-based platform 1304 would have the widest possible coverage at the expense of data transfer rate due to hardware limitations of the satellite or transmission requirements.

Figure 14:
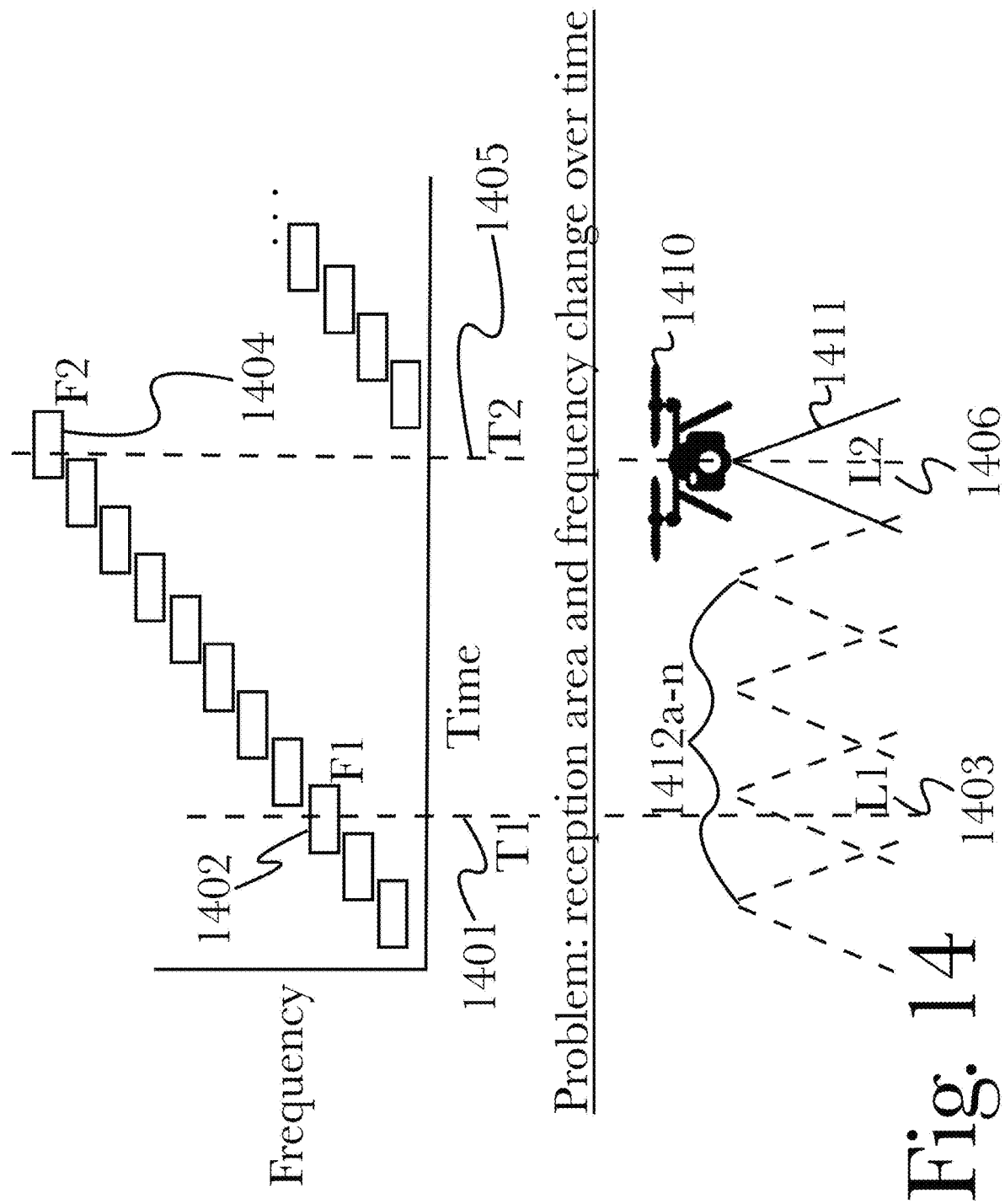
FIG. 14 is a diagram illustrating frequency band scanning, according to one aspect.

FIG. 14 is a diagram illustrating a problem associated with frequency band scanning where the sensor is scanning from a moving platform, according to one aspect. A common method of scanning a broad spectrum of radio frequency signals with a single receiver is to successively scan narrow ranges of frequencies over short intervals. For example, certain currently-available software defined radios (SDRs) can scan a spectrum from 70 Mhz to 6 GHz, and do so by successively scanning small frequency bands for brief periods of time, as defined by their programming. For example, if an SDR is programmed to scan the entire 70 MHz to 6 GHz spectrum in 20 MHz frequency bands for 67 ms in each band, it would require approximately 20 seconds to scan the entire spectrum. While this is an efficient method of scanning a broad spectrum with a single receiver, such a receiver mounted on a fast, mobile platform like an airplane would travel a significant distance during that time. Thus, as the platform travels during scanning, it will be scanning a slightly different geographical area for each frequency band.

However, the use of a mobile scanner 1410 (such as a vehicle-based sensor on a car or aircraft) may miss detection of the signal of interest as it moves. Any given sensor scan 1411 may include a particular frequency band at that time, but as the platform moves it changes the band being scanned for emissions, resulting in historical scans 1412a-n that may each cover a different physical area, or a different frequency band, or both. This introduces complexity and errors due to incomplete scan coverage, as a signal of interest may require a scan to be in the right place at the right time, while also scanning the correct frequency band. For example, at time T1 1401, the mobile platform 1410 is scanning frequency band F1 1402 at location L1 1403. A signal F2 1404 transmitted at that same time and location would not be detected. The signal F2 1404 can only be detected by the scanner on the mobile platform 1410 at time T2 1405 at location L2 1406. Using a single mobile scanner 1410 is insufficient to reliably detect the signal of interest without performing many repeated sensor sweeps at an offset, to ensure that eventually all possible combinations of frequency, time, and location have been checked.

Figure 15:
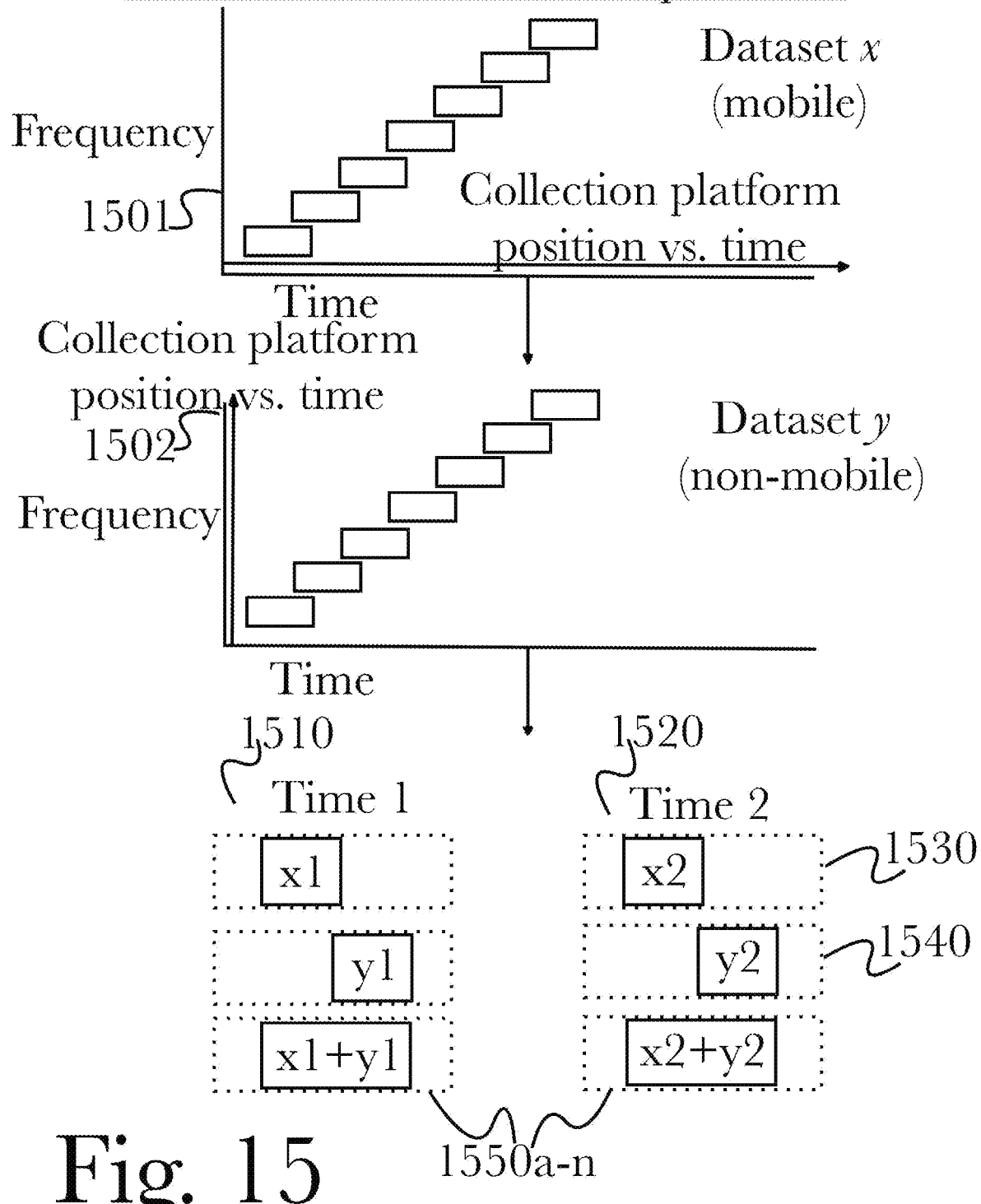
FIG. 15 is a diagram illustrating changes in signals over time, highlighting problems addressed by the large-scale radio frequency signal platform of the invention.

FIG. 15 is a diagram illustrating a solution to the problem of scanning from a mobile platform, according to one aspect, which is to combine the data from the mobile platforms with data from non-mobile platforms to generate an enriched dataset. As shown, any given sensor may be scanning at a particular time 1510, 1520 and in a certain location 1530, 1540. Both mobile scanners 1501 and stationary scanners 1502 may be used, and their respective sensor data may be collected and combined into a single enriched dataset 1550a-n, comprises the combined data from multiple scanners. In this way, the shortcomings of any particular scanner may be overcome by the combined data from another scanner, for example a mobile scanner 1501 may be changing position while also changing scan frequency over time, while a stationary scanner 1502 remains in one location while changing frequency over time (thus ensuring that, at the location of the stationary scanner, data is present for all scanned frequencies). An enriched dataset 1550a-n may comprise any combination of sensor data from any number of sensors, for example multiple sensors may be combined to form more complete geographical coverage of an area, multiple frequency bins may be combined to create a dataset encompassing a wide block of the radio frequency signal spectrum at a given time or in a given area, or other such combinations. This enables working with data from many sensors or collection platforms as a singular unit, enabling advanced analysis over large datasets that comprise many data points collected at a high level of granularity, such that detail is not lost when combining data into an enriched dataset 1550a-n.

Figure 16:
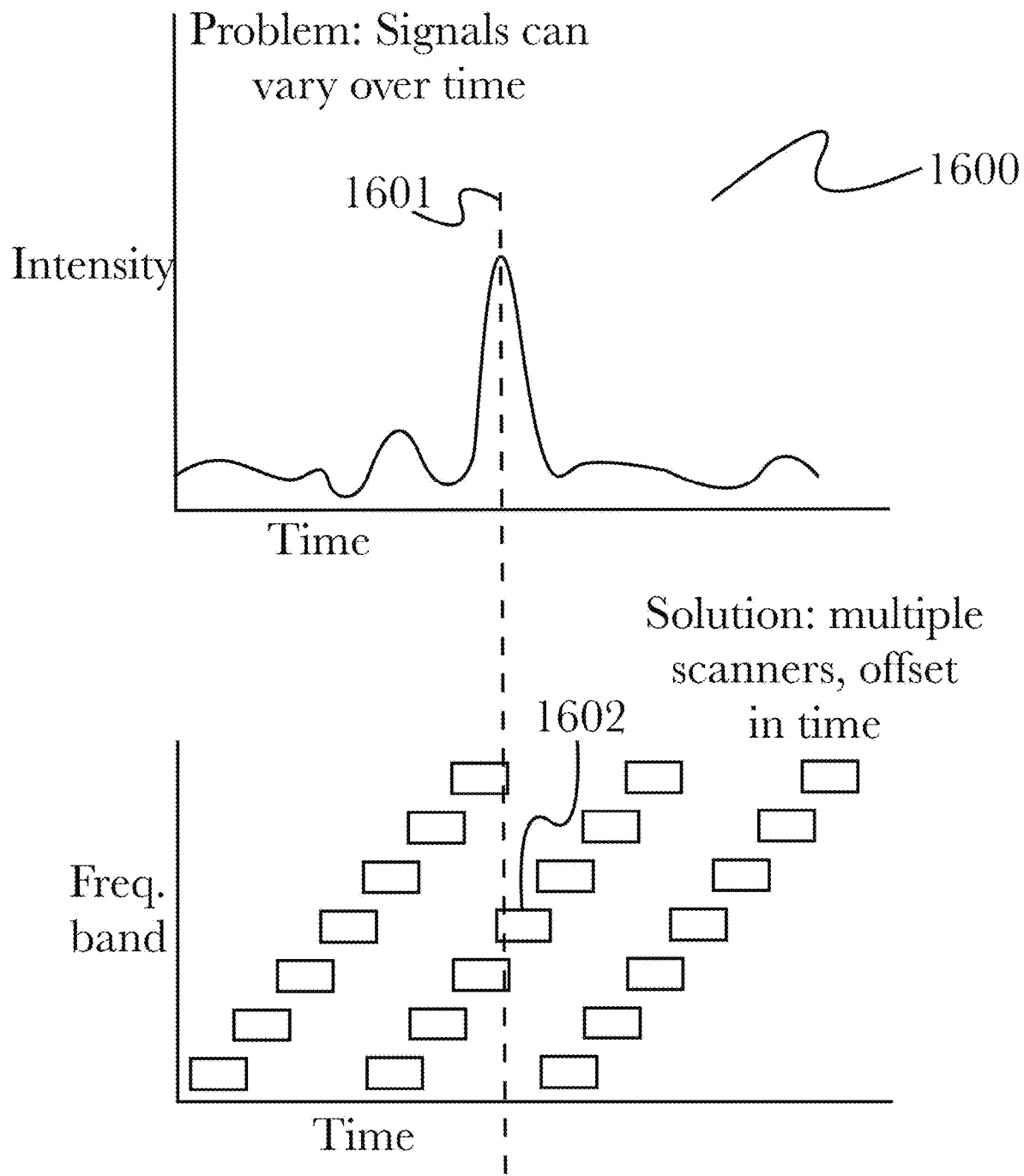
FIG. 16 is a diagram illustrating the merging of multiple datasets into an enriched dataset using a large-scale radio frequency signal platform, according to one aspect.

FIG. 16 is a diagram illustrating changes in signals over time, highlighting a different, but related, problem with scanning a broad spectrum of radio frequency signals using a single receiver. As shown, within a given frequency band 1600 there may be changes in emission intensity over time. If a peak in intensity occurs at a particular time 1601, detection requires that a sensor be tuned to the frequency band at that time, and also receiving in the location where the emission is present. By using multiple sensors or collection platforms, a large-scale radio frequency signal collection platform can improve detection by ensuring that at any given time, there is a sensor in a given area receiving on a given frequency 1602. Rather than relying on a single sensor to be receiving on the right frequency in the right place at the right time, multiple sensors may be offset and their respective data combined (each receiving on a separate frequency band at the same time in the same area), so that their combined sensor data comprises a more complete dataset that may be analyzed as a whole, ensuring that a signal of interest is properly detected.

Figure 17:
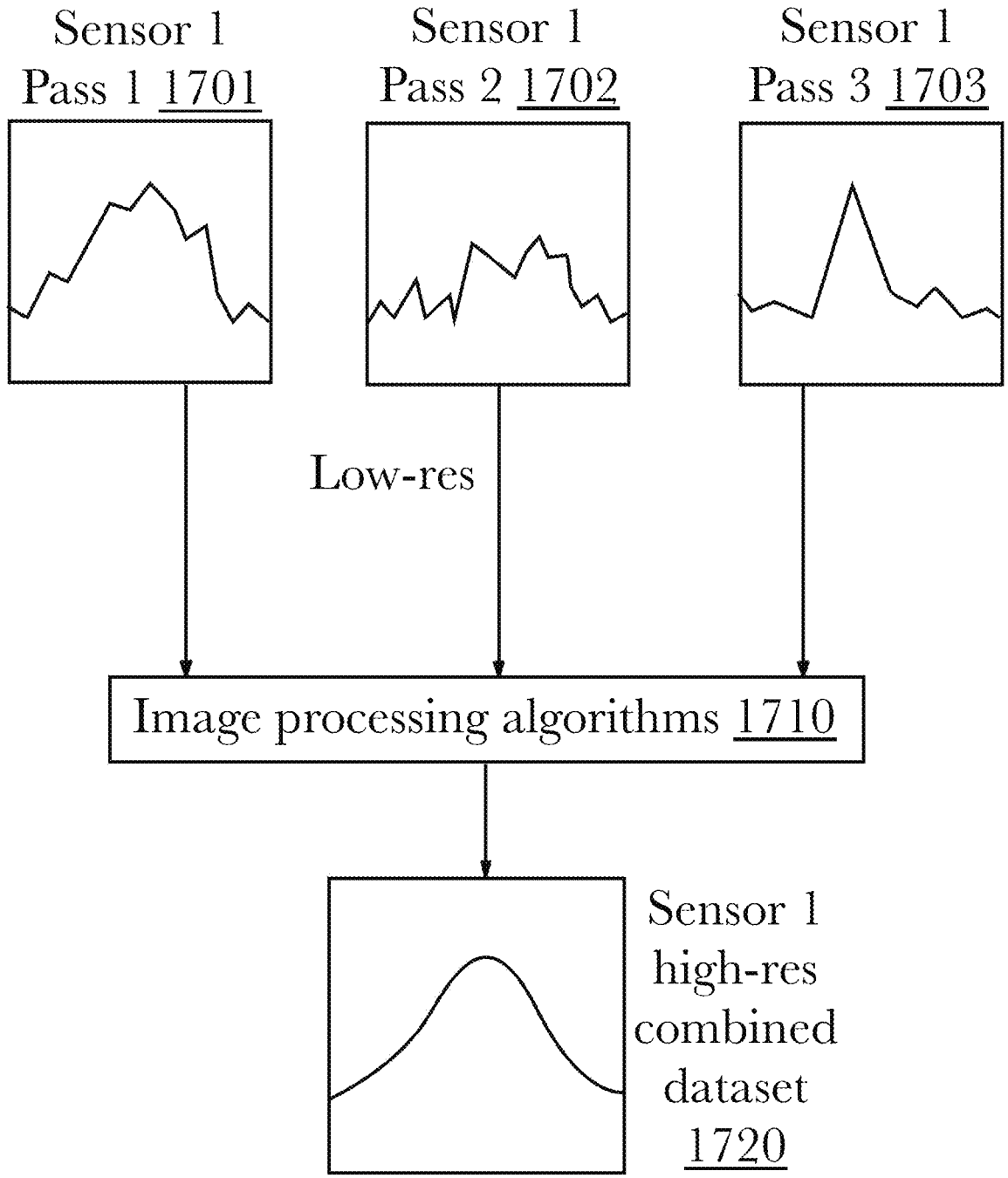
FIG. 17 is a diagram illustrating resolution enhancement for an enriched dataset.

FIG. 17 is a diagram illustrating resolution enhancement 1700 for an enriched dataset. To improve the resolution (that is, the level of granularity or detail available in the data) of an enriched dataset, multiple individual low-resolution datasets 1701-1703 may be collected. These may be, for example, multiple scanning passes from a single sensor (as illustrated), or single passes from each of multiple sensors, or other arrangements that create multiple datasets that comprise similar data (for example, multiple sensors scanning the same geographical area). These disparate datasets may then be processed using any of a variety of statistical, signal, and/or image processing algorithms 1710. The resulting post-processed data may then be combined into a single, high-resolution dataset 1720, from which additional details and data insights may be drawn. This technique applies processing methods to data to reveal additional detail that would be missed using existing data handling techniques, by interacting with the underlying data in its original form to utilize the benefits of combined analysis.

Figure 18:
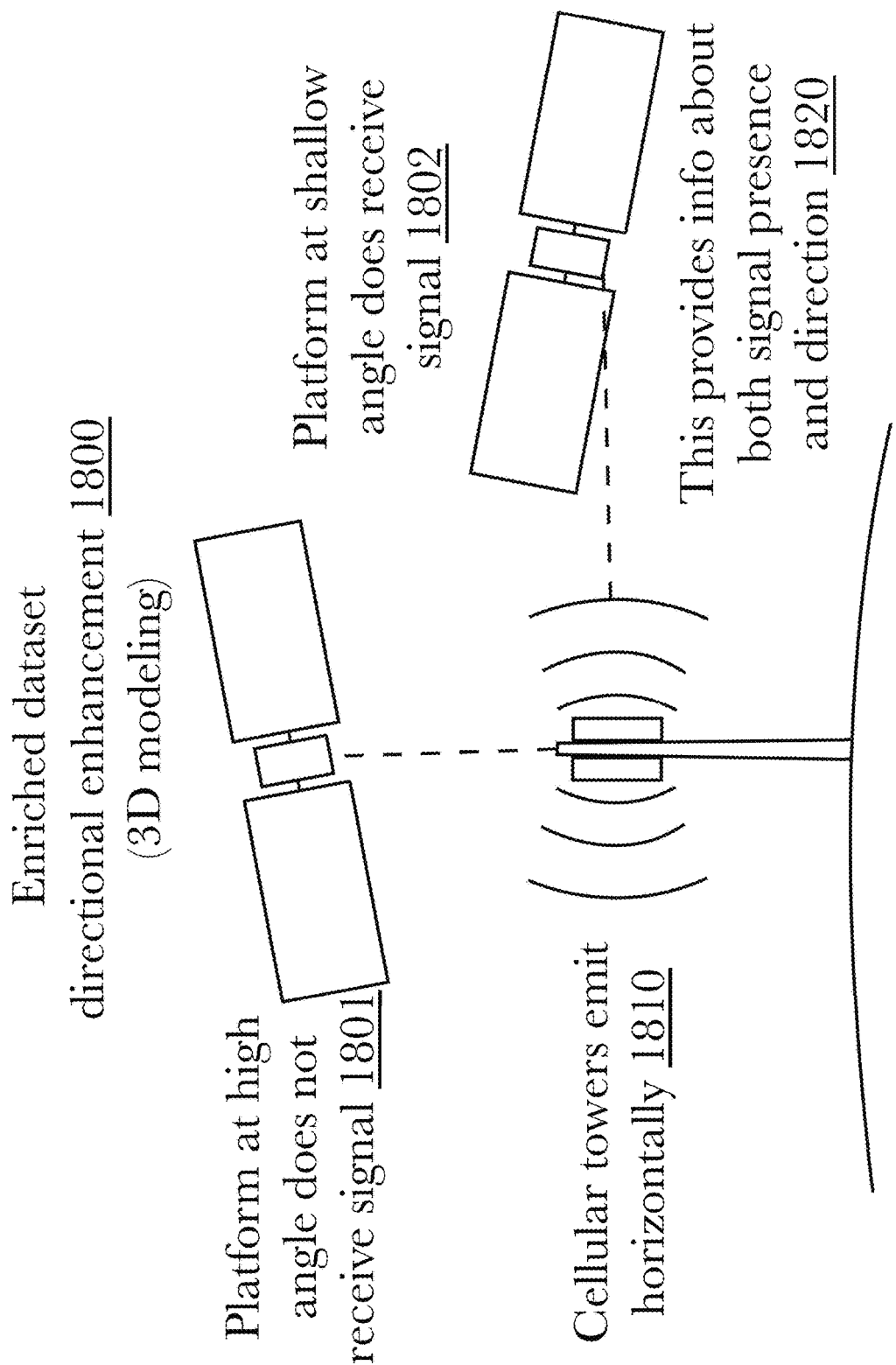
FIG. 18 is a diagram illustrating directional enhancement for an enriched dataset.

FIG. 18 is a diagram illustrating directional enhancement 1800 for an enriched dataset. Some emitters, such as cellular base transceiver stations (BTSes), commonly known as cell towers, emit asymmetric patterns such as a flattened torus or other horizontal emission pattern 1810. This creates issues when a collection platform is at a high angle above the emitter 1801, where the platform may not receive a signal as it is outside the emission pattern. However, another platform may be at a shallower angle 1802 that places it within the emission pattern, and this second platform will therefore receive signals from the emitter 1810. By combining the data from each of these platforms into an enriched dataset, not only will the signal be included in the dataset (when it would have otherwise been missed in any dataset from the first, steep-angle platform), but due to the directional nature of the emissions and positioning of the platforms it becomes possible to form a 3D model of the emission patterns and signal directions 1820. This enables the detection of signal presence, identification of signal type, and directionality, as well as the precise locating of emission sources through techniques such as (for example) signal triangulation using multiple platforms.

As another example, directional enhancement may be used to geolocate a signal. Another example is geolocating a signal by fusing multiple measurements together to locate an emitter. These multiple measurements can be from a single sensor making measurements over a period of time, or from multiple sensors possible on multiple different types of platforms taking measurement at the same time or not at the same time, and combining the measurements.

FIG. 19 is a diagram illustrating scale and detail enhancement 1900 for an enriched dataset. When multiple platforms are used at multiple levels of scale, signals may be received at one platform and used to direct the behavior of additional platforms at lower scales 1910. For example, a satellite platform 1901 which has a very large area but low level of detail (resolution), may receive a signal while scanning a nation-scale area as shown. This may be used to direct an aerial platform 1902 with a smaller scale but higher level of detail, to scan the area where the signal was detected in order to more precisely locate the source. This in turn may be used to direct mobile 1903 and fixed 1904 ground platforms to scan within the region, zeroing-in on the emission source using increasingly fine-grained scanning from platforms at smaller scales. This provides the ability to rapidly locate the precise source of emissions, while scanning large areas rapidly using low-detail, large-area scanners rather than having to scan a large area with high-detail scanners. Conversely, a local, fixed ground platform might sense a change in the signal environment. This change could act as a cue to sensors on airborne or satellite platforms to reconfigure, repoint, or reposition their sensors.

Computer Architecture

Generally, the data processing techniques disclosed herein may be implemented on computer hardware or a combination of computer software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

In other cases, purpose-built computing devices designed to perform specific functions may be used. In some cases, the purpose-built computing devices may comprise application-specific integrated circuits. This is particularly the case where high speed or real time performance is required, or where limitations are placed on physical size, memory capacity, processor speed due to space constraints, budgetary constraints, and the like. Such purpose-built computing systems may be embedded into other devices (where they are often called "embedded systems").

Figure 20:
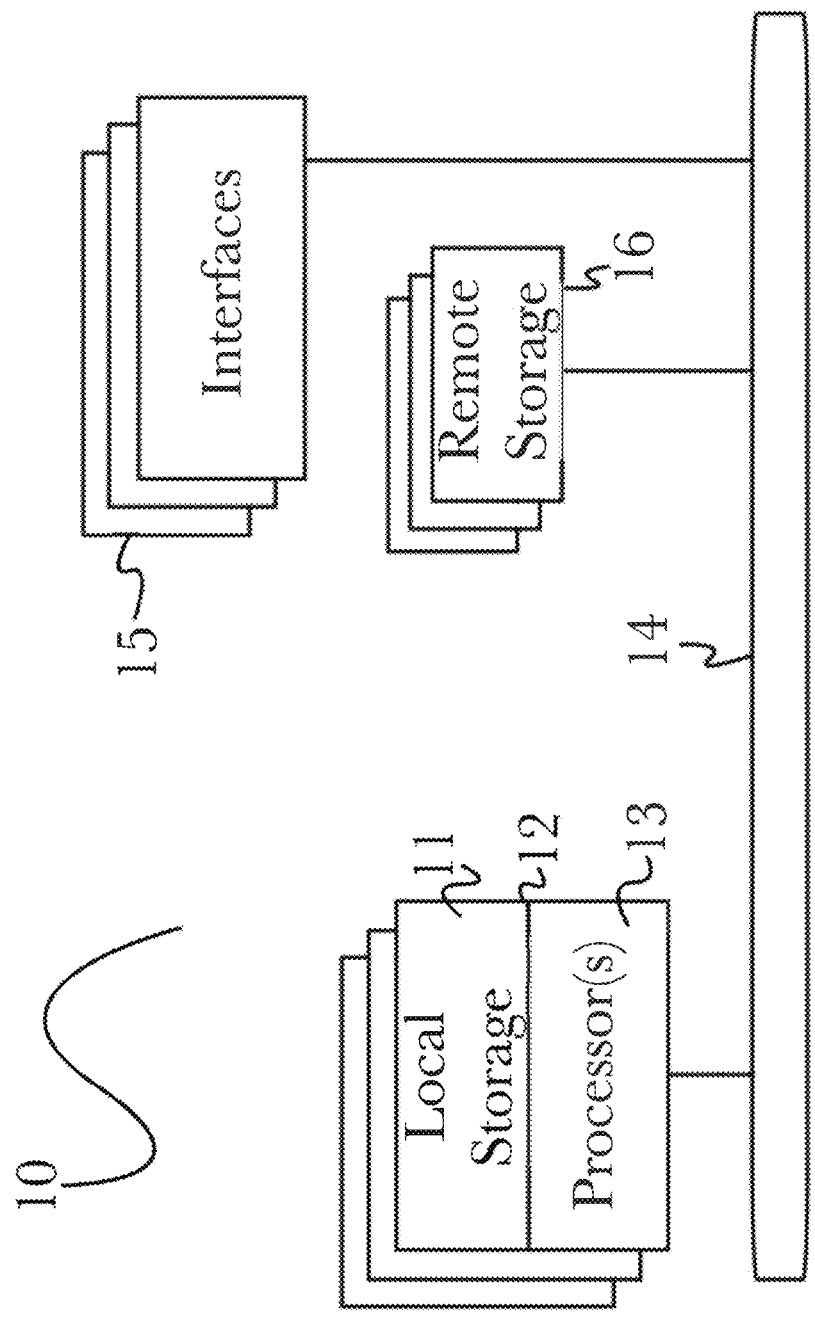
FIG. 20 is a block diagram illustrating an exemplary hardware architecture of a computing device.

Referring now to FIG. 20, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (radio frequency signal), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI)

interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 20 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 21:
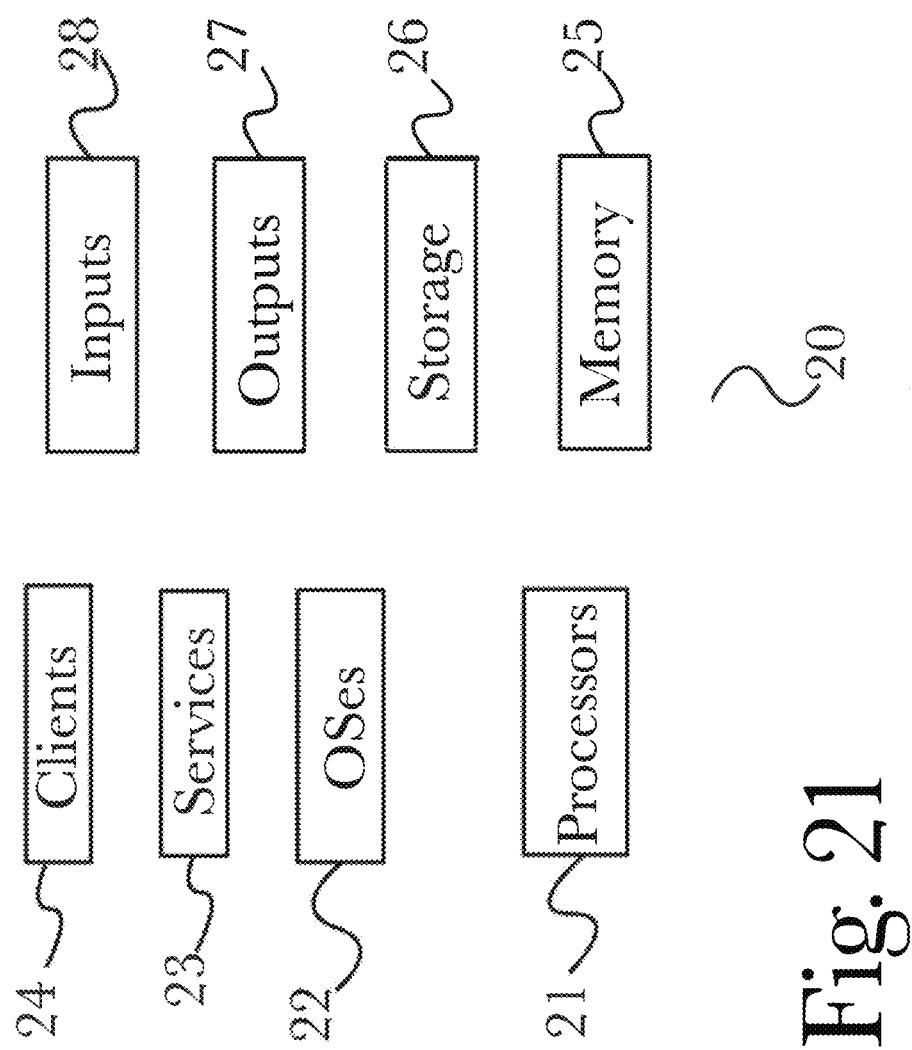
FIG. 21 is a block diagram illustrating an exemplary logical architecture for a client device.

In some aspects, systems may be implemented on a standalone computing system. Referring now to FIG. 21, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, mradio frequency signalistor, or electrical storage device for storage of data in digital form (such as those described above, referring to FIG. 20). Examples of storage devices 26 include flash memory, magnetic hard drive, CD-ROM, and/or the like.

Figure 22:
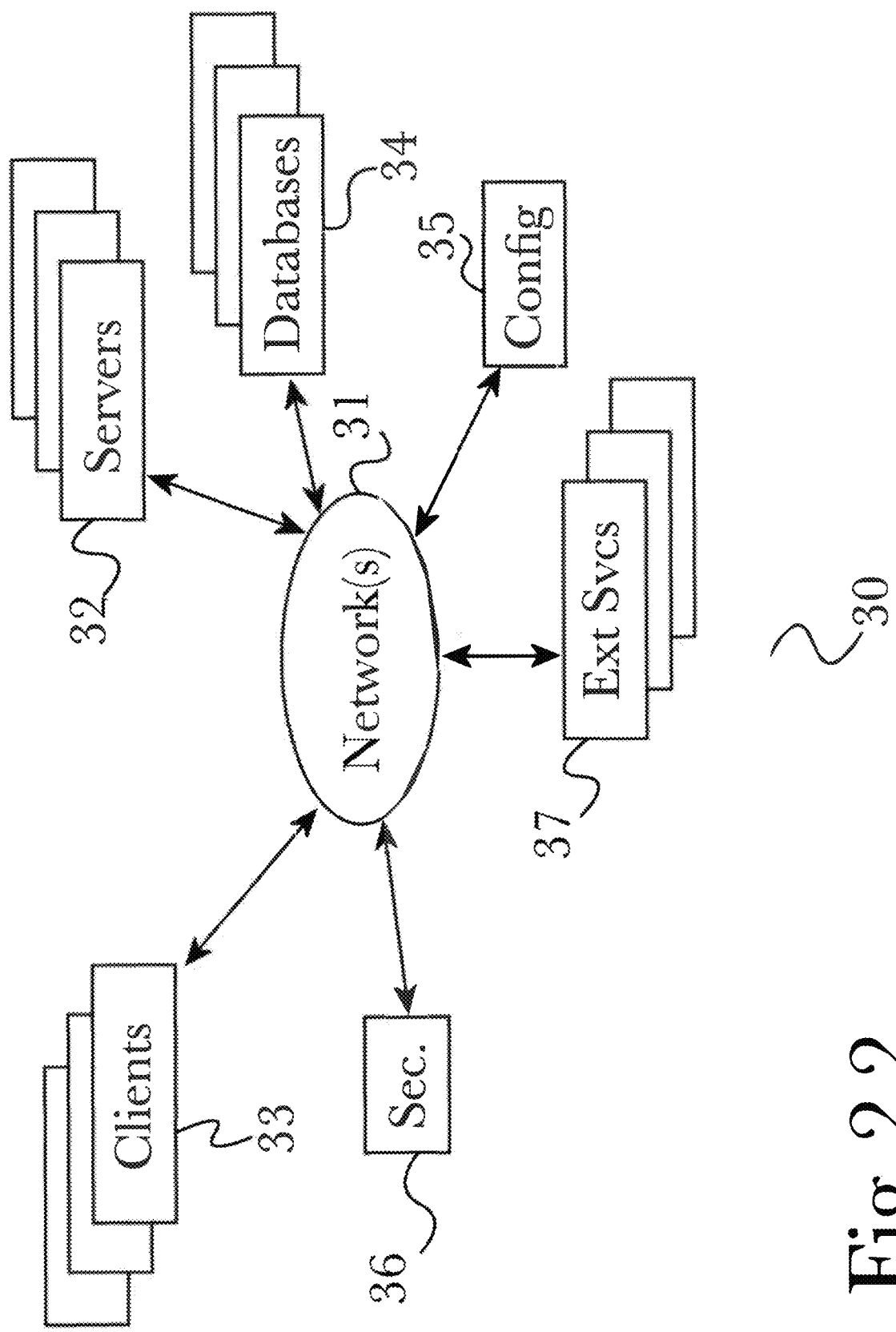
FIG. 22 is a block diagram showing an exemplary architectural arrangement of clients, servers, and external services.

In some aspects, systems may be implemented on a distributed computing network, such as one having any number of clients and/or servers. Referring now to FIG. 22, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 21. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other).

Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 23:
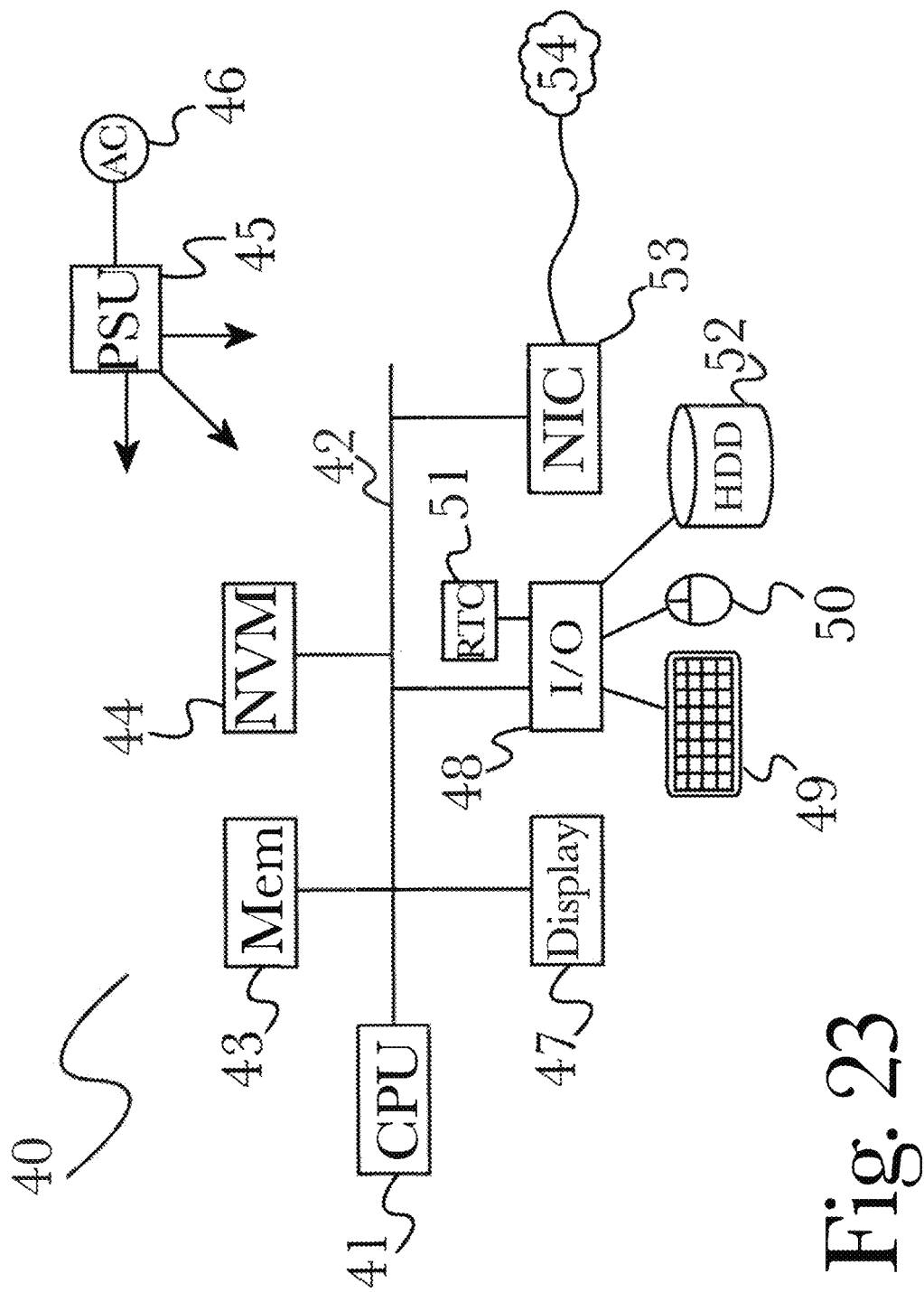
FIG. 23 is another block diagram illustrating an exemplary hardware architecture of a computing device.

FIG. 23 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for large-area, wide-bandwidth radio frequency signal collection and processing, comprising:
   one or more collection platforms, each comprising:
   one or more radio frequency sensor systems configured to capture signal information comprising radio frequency data; and
   one or more metadata collectors configured to capture signal information comprising metadata about the radio frequency data, including at least a time, a frequency, and a location of capture; and
   an emission source analyzer comprising a processor, a memory, and a plurality of programming instructions stored in the memory which, when operating on the processor, cause the processor to:
   receive signal information from one or more of the collection platforms;
   pre-process the signal information to perform any combination of normalizing, reducing, analyzing, filtering, or organizing the data; and
   use the pre-processed data to:
   identify one or more radio frequency signals from an emission source; and
   generate radio frequency landscape information for the emission source, including at least:
   the frequencies of radio frequency signal emissions from the emission source; and
   the signal power of radio frequency signal emissions from the emission source;
   wherein a radio frequency signal detected by a sensor system or network of sensor systems triggers collection of more detailed data, less detailed data, wider area, narrower area, higher resolution, and/or lower resolution by the same sensor at a different location or time, or by at least one other sensor system on a related or unrelated collection platform or platforms.

2. The system of claim 1, further comprising an enriched dataset generator comprising at least a plurality of programming instructions stored in a memory which, when operating on a processor, cause the processor to:
receive a plurality of datasets comprising pre-processed signal information and further comprising at least one common or overlapping characteristic;
separate each dataset into at least a spatial component, a time domain component, and a frequency domain component;
map each element of each component of each dataset to their analogues in each of the other datasets in the plurality of datasets;
develop statistics and metrics for one or more of the components; and
combine the plurality of datasets, their components, and the mapping between them into a single dataset of higher information content than any one of the datasets comprising the plurality of datasets.

3. The system of claim 2, wherein the enriched dataset comprises sufficient information to produce a geographical map of radio frequency signals in a given area.

4. The system of claim 2, wherein the enriched dataset further comprises derivative information allowing production of a geographical map of radio frequency signals in a given area supplemented with analysis and statistics of radio frequency activity.

5. The system of claim 2, wherein the enriched dataset further comprises time information allowing production of a geographical map showing changes over time in the map of radio frequency signals in a given area.

6. The system of claim 5, wherein the enriched dataset further comprises population density information allowing production of a geographical map showing changes in population density over time relative to changes over time of radio frequency signals in a given area.

7. The system of claim 5, wherein the enriched dataset further comprises other non-radio-frequency-signal information allowing production of a map showing changes in the other non-radio-frequency-signal information over time relative to changes over time of radio frequency signals in a given area.

8. A method for large-area, wide-bandwidth radio frequency signal collection and processing, comprising the steps of:
capturing signal information comprising radio frequency data and using radio frequency sensor systems on one or more collection platforms;
capturing signal information comprising metadata about the radio frequency data, including at least a time, a frequency, and a location of capture, using metadata collectors on one or more collection platforms; and
receiving signal information at an emission source analyzer from one or more of the collection platforms;
pre-processing the signal information to perform any combination of normalizing, reducing, analyzing, filtering, or organizing the data; and
using the pre-processed data to:
identify one or more radio frequency signals from an emission source; and
generate radio frequency landscape information for the emission source, including at least:
the frequencies of radio frequency signal emissions from the emission source; and
the signal power of radio frequency signal emissions from the emission source;
wherein a radio frequency signal detected by a sensor system or network of sensor systems triggers collection of more detailed data, less detailed data, wider area, narrower area, higher resolution, and/or lower resolution by the same sensor at a different location or time, or by at least one other sensor system on a related or unrelated collection platform or platforms.

9. The method of claim 8, further comprising the steps of:
receiving into an enriched dataset a plurality of datasets comprising pre-processed signal information and further comprising at least one common or overlapping characteristic;
separating each dataset into at least a spatial component, a time domain component, and a frequency domain component;
mapping each element of each component of each dataset to their analogues in each of the other datasets in the plurality of datasets;
developing statistics and metrics for one or more of the components; and
combining the plurality of datasets, their components, and the mapping between them into a single dataset of higher information content than any one of the datasets comprising the plurality of datasets.

10. The method of claim 9, wherein the enriched dataset comprises sufficient information to produce a geographical map of radio frequency signals in a given area.

11. The method of claim 9, wherein the enriched dataset further comprises derivative information allowing production of a geographical map of radio frequency signals in a given area supplemented with analysis and statistics of radio frequency activity.

12. The method of claim 9, wherein the enriched dataset further comprises time information allowing production of a geographical map showing changes over time in the map of radio frequency signals in a given area.

13. The method of claim 12, wherein the enriched dataset further comprises population density information allowing production of a geographical map showing changes in population density over time relative to changes over time of radio frequency signals in a given area.

14. The method of claim 12, wherein the enriched dataset further comprises other non-radio-frequency-signal information allowing production of a map showing changes in the other non-radio-frequency-signal information over time relative to changes over time of radio frequency signals in a given area.

* * * * *